US011999570B2

(12) United States Patent
Valinsky et al.

(10) Patent No.: US 11,999,570 B2
(45) Date of Patent: Jun. 4, 2024

(54) MATERIAL HANDLING SYSTEM

(71) Applicant: OPEX Corporation, Moorestown, NJ (US)

(72) Inventors: Joseph Valinsky, Moorestown, NJ (US); Alexander Stevens, Moorestown, NJ (US)

(73) Assignee: OPEX Corporation, Moorestown, NJ (US)

( * ) Notice: Subject to any disclaimer, the term of this patent is extended or adjusted under 35 U.S.C. 154(b) by 0 days.

(21) Appl. No.: 18/216,656

(22) Filed: Jun. 30, 2023

(65) Prior Publication Data

US 2024/0034562 A1 Feb. 1, 2024

Related U.S. Application Data

(63) Continuation of application No. 17/847,049, filed on Jun. 22, 2022, now Pat. No. 11,713,192, which is a (Continued)

(51) Int. Cl.
*B65G 1/04* (2006.01)
*B25J 9/16* (2006.01)
(Continued)

(52) U.S. Cl.
CPC .......... *B65G 1/1375* (2013.01); *B25J 9/1687* (2013.01); *B65G 1/0471* (2013.01); (Continued)

(58) Field of Classification Search
CPC ............................... B65G 1/0471; B65G 1/10
See application file for complete search history.

(56) References Cited

U.S. PATENT DOCUMENTS 3,746,189 A 7/1973 Burch et al.
3,800,963 A 4/1974 Holland
(Continued)

FOREIGN PATENT DOCUMENTS

CN 108706265 10/2018
WO 2019109644 6/2019

OTHER PUBLICATIONS

International Search Report and Written Opinion for International application No. PCT/US20/46263 dated Nov. 4, 2020.
(Continued)

*Primary Examiner* — Mark C Hageman
(74) *Attorney, Agent, or Firm* — Brian Dinicola

(57) ABSTRACT

A system may include a vehicle for delivering items and a moveable track that cooperates with the vehicle. The moveable track may cooperate with a storage system having storage locations for storing items. The vehicle may drive into the moveable track and lift the track using a vertical drive mechanism. The vehicle may include a horizontal drive system operable to drive the vehicle horizontally along the ground to carry the moveable track to a position adjacent the storage location. The vehicle may operate the vertical drive system to drop the moveable track adjacent the storage system. Additionally, the vehicle may operate the vertical drive to drive up the moveable track to an elevated position adjacent one of the storage locations in the storage system. The vehicle may include a transfer mechanism for transferring items between the vehicle and the storage location while the vehicle is in the elevated position.

15 Claims, 21 Drawing Sheets

Related U.S. Application Data continuation of application No. 17/564,353, filed on Dec. 29, 2021, now Pat. No. 11,731,834, which is a continuation of application No. 16/993,301, filed on Aug. 14, 2020, now Pat. No. 11,254,504.

(60) Provisional application No. 62/886,602, filed on Aug. 14, 2019.

(51) Int. Cl.
| | | |
|---|---|---|
| *B65G 1/06* | (2006.01) | |
| *B65G 1/10* | (2006.01) | |
| *B65G 1/137* | (2006.01) | |
| *G05D 1/00* | (2006.01) | |
| *G06Q 10/087* | (2023.01) | |

(52) U.S. Cl.
CPC ........... *B65G 1/0492* (2013.01); *B65G 1/065* (2013.01); *B65G 1/10* (2013.01); *B65G 1/1371* (2013.01); *B65G 1/1373* (2013.01); *B65G 1/1376* (2013.01); *B65G 1/1378* (2013.01); *G05D 1/0027* (2013.01); *G06Q 10/087* (2013.01)

(56) References Cited

U.S. PATENT DOCUMENTS

| | | |
|---|---|---|
| 4,492,504 A | 1/1985 | Hainsworth |
| 6,805,526 B2 | 10/2004 | Stefani |
| 7,101,139 B1 | 9/2006 | Benedict |
| 7,381,022 B1 | 6/2008 | King |
| 7,931,431 B2 | 4/2011 | Benedict et al. |
| 9,334,113 B2 | 5/2016 | Naylor |
| 9,409,714 B2 | 8/2016 | Dibble |
| 10,800,606 B2 | 10/2020 | Lert, Jr. |
| 10,850,959 B2 | 12/2020 | Goetz |
| 11,104,516 B2 | 8/2021 | Li |
| 11,208,264 B2 | 12/2021 | Moulin et al. |
| 11,254,504 B2 | 2/2022 | Opex |
| 2007/0065258 A1 | 3/2007 | Benedict |
| 2008/0131241 A1 | 6/2008 | King |
| 2016/0355337 A1 | 12/2016 | Lert |
| 2017/0267452 A1 | 9/2017 | Goren |
| 2018/0127212 A1 | 5/2018 | Jarvis |
| 2018/0148259 A1 | 5/2018 | Gravelle et al. |
| 2018/0305122 A1 | 10/2018 | Moulin |
| 2022/0227579 A1 | 7/2022 | Wu et al. |

OTHER PUBLICATIONS

Extended Search Report issued in Europe for Application No. 20851930.6 dated Aug. 7, 2023.

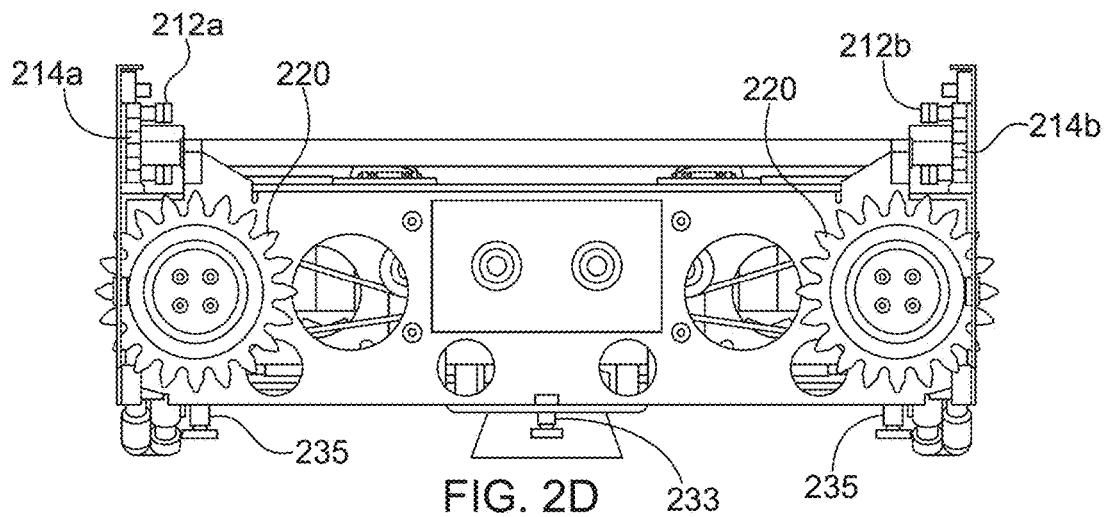
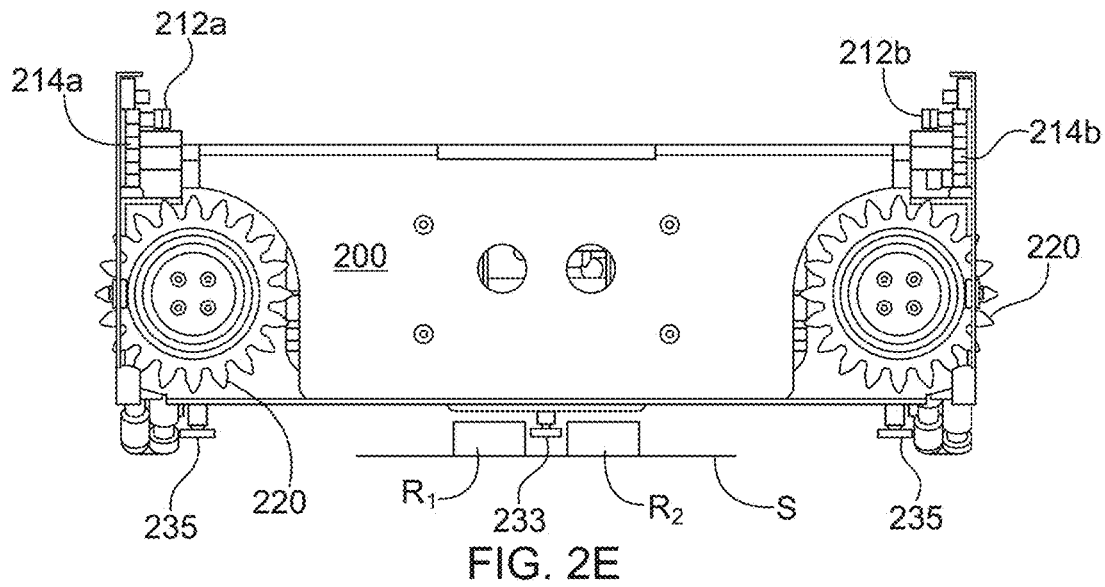
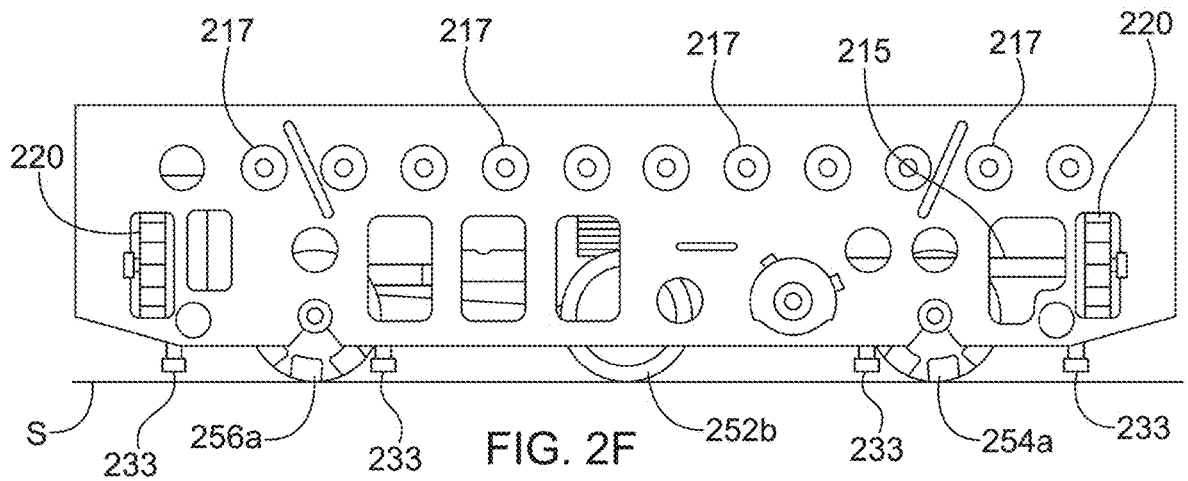

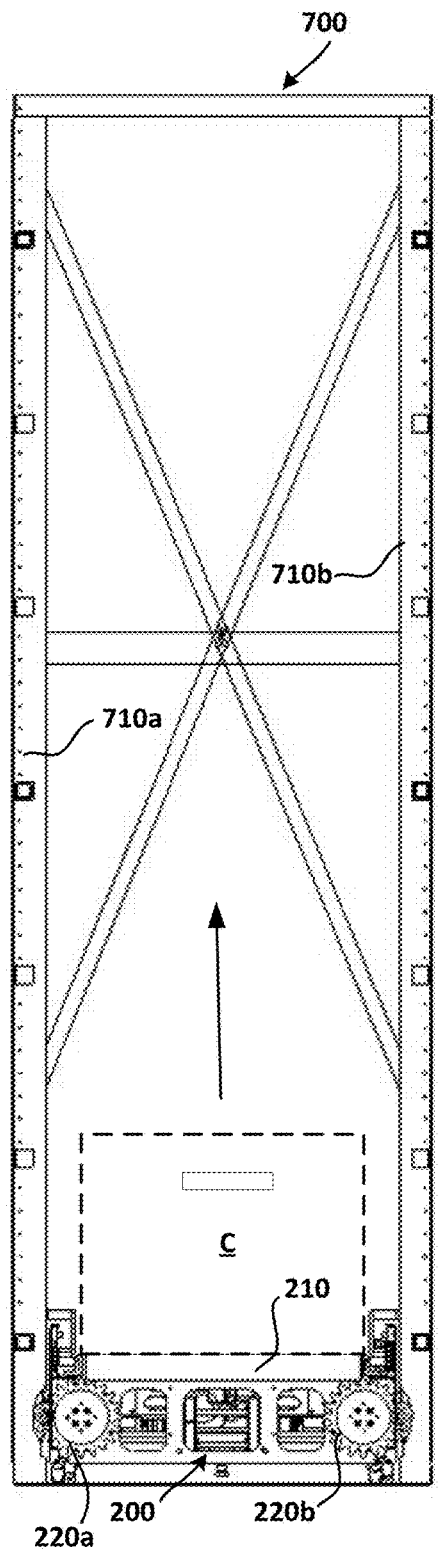
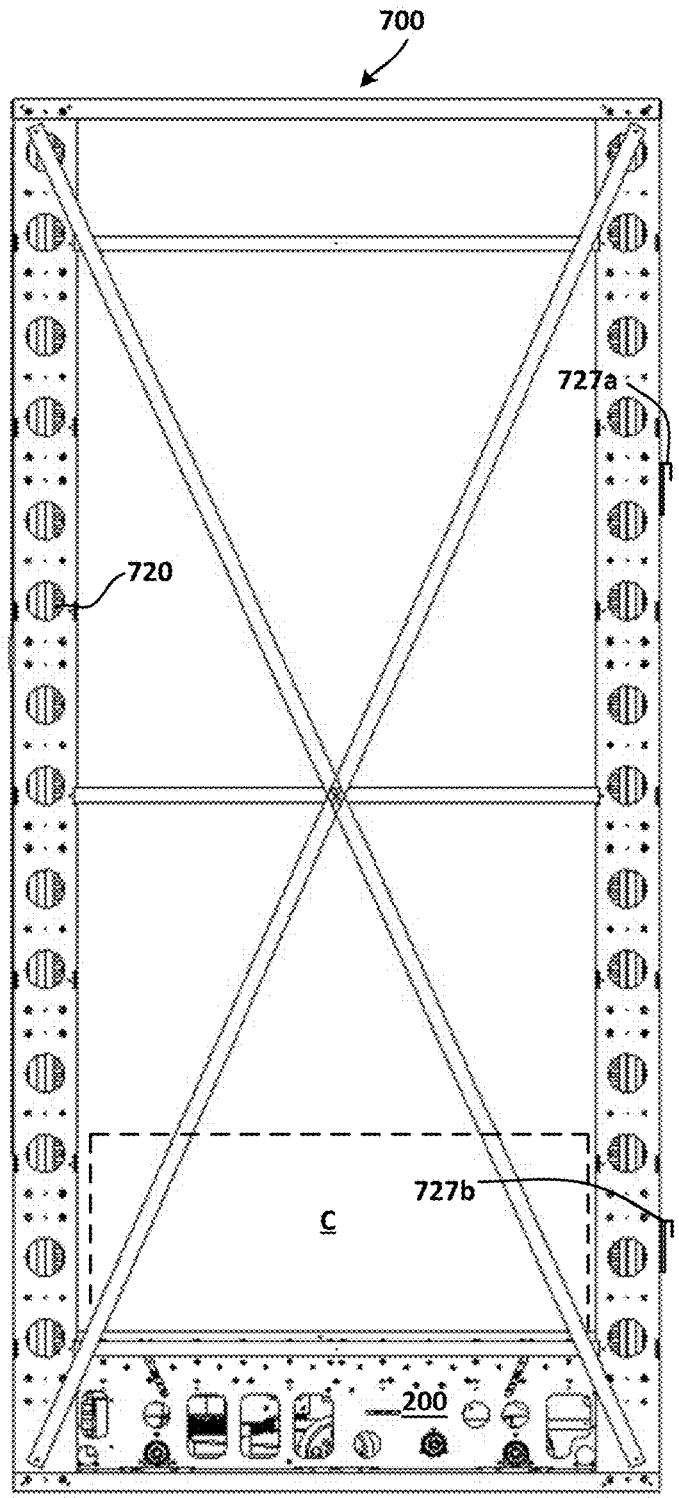
FIG 5A                    FIG 5B

MATERIAL HANDLING SYSTEM

PRIORITY CLAIM

This application is a continuation co-pending U.S. patent application Ser. No. 17/847,049 filed Jun. 22, 2022, which is a continuation of U.S. patent application Ser. No. 17/564,353 filed Dec. 29, 2021, which is a continuation of U.S. patent application Ser. No. 16/993,301 filed Aug. 14, 2020, now issued as U.S. Pat. No. 11,254,504, which claims priority under 35 U.S.C. § 119 to U.S. Provisional Patent Application No. 62/886,602 filed on Aug. 14, 2019. The entire disclosure of each of the foregoing applications is hereby incorporated herein by reference.

FIELD OF THE INVENTION

Embodiments of the present invention generally relate to automated material and article handling systems which can be used in warehouse, storage and/or distribution environments.

BACKGROUND

Modern material handling systems, such as those used in mail-order warehouses, supply chain distribution centers, and custom-order manufacturing facilities, face significant challenges in responding to requests for inventory articles. In their incipiency, enterprises will generally invest in a level of automation that is at least adequate for current needs. As the scale of an inventory management system expands to accommodate a greater number and variety of articles, however, so too does the cost and complexity of operating it to simultaneously complete the packing, storing, replenishment, and other inventory management tasks for which it is intended.

Failure to efficiently utilize resources such as space, equipment, and manpower in an inventory management facility results in lower throughput, longer response times, and a growing backlog of unfinished tasks. Greater efficiency may often be achieved, for a time, by incrementally expanding the capacity of the facility's existing automation infrastructure, particularly when that expansion follows a well-conceived plan for growth. Sooner or later, however, a point of diminishing returns is encountered. That is, the achievement of further gains in capacity and/or functionality eventually becomes cost prohibitive as compared to available alternatives, if such gains can be realized at all. When that point of diminishing returns is reached, a facility operator may be forced to abandon pre-existing material handling infrastructure and to replace that infrastructure with a completely new automation platform.

SUMMARY OF THE INVENTION

The present invention provides a number of inventive aspects that relate to material handling and/or storage and retrieval processes.

According to one aspect, a method for delivering items to a storage assembly having a plurality of storage locations is provided. The method includes the step of providing a vehicle having a first drive system for driving the vehicle in a horizontal direction and a second drive system. A moveable track is provided having an opening configured to receive a portion of the vehicle. The first drive system is actuated to drive the vehicle along a horizontal surface to a position adjacent the moveable track. The vehicle is aligned with the opening in the moveable track. At least a portion of the vehicle is driven into the opening. The second drive system is actuated to raise the moveable track vertically to lift the moveable track off the ground. The first drive system is actuated to drive the vehicle with the moveable track in a horizontal direction toward the storage assembly. The second drive system is actuated to drive the vehicle vertically up the moveable track to a position adjacent one of the storage locations. An item is transferred between the vehicle and the one storage location while the vehicle is adjacent the one storage location. Additionally, the second drive system is actuated to drive the vehicle downwardly toward the ground.

According to another aspect, a method is provided for delivering items to a storage assembly having a plurality of storage locations. The method includes a plurality of steps, which may include the step of driving a vehicle along a horizontal surface to a position adjacent a moveable track. The method may also include the step of operating the vehicle to lift the moveable track. Optionally, the method includes the step of driving the vehicle horizontally to carry the moveable track to a position adjacent the storage assembly. Additionally, the method may include the step of driving the vehicle vertically upwardly along the moveable track to an elevated position. Further, the method optionally includes the step of transferring an item between the vehicle and a storage location in the storage assembly while the vehicle is in the elevated position. The method may also include the step of driving the vehicle vertically down the track after the step of transferring an item.

According to another aspect, a method for delivering items to a storage assembly may include the step of transferring an item from a storage location onto a vehicle, wherein the method comprises the step of driving the vehicle horizontally with the item to deliver the item to a location remote from the one storage location.

According to yet another aspect, a method for delivering items to a storage assembly may include a moveable track that comprises a frame configured to receive the vehicle and the method may include the step of driving the vehicle into the frame.

According to a further aspect, a method for delivering items to a storage assembly may include the step of positioning a vertical drive of a vehicle in operative engagement with a vertical track of a moveable track.

According to an additional aspect, a method for delivering items to a storage assembly may include the step of actuating vertical drive of a vehicle to lower a moveable track after a step of actuating horizontal drive system to drive the vehicle with the moveable track.

According to another aspect, a method for delivering items to a storage assembly may include the step of controlling a vehicle to displace a moveable track to releasably connect the moveable track with the storage assembly. Optionally, the step of connecting may comprise releasably connecting the moveable track with the storage assembly to impede displacement of the moveable track relative to the storage assembly along at least one horizontal axis.

According to a further aspect, a method for delivering items to a storage assembly may include a moveable track having a connector and the method may include the step of driving a horizontal drive of a vehicle to displace the moveable track vertically to connect the connector of the moveable track with the storage assembly.

According to an additional aspect, a method for delivering items to a storage assembly may include the step of controlling a vehicle to disconnect a moveable track from the storage assembly. Optionally, the step of disconnecting comprises vertically displacing the moveable track.

According to another aspect, a method for delivering items to a storage assembly may include the step of actuating a vertical drive of a vehicle to raise a moveable track by driving the vertical drive system in a first direction.

According to a further aspect, a method for delivering items to a storage assembly may include the step of actuating a vertical drive of a vehicle to drive the vehicle vertically up by driving the vertical drive system in a second direction that is opposite the first direction.

According to another aspect, a method for delivering items to a storage assembly may include the step of actuating a vertical drive system of a vehicle to drive the vehicle vertically up while maintaining the orientation of the vehicle relative to the horizon as the vehicle is driven upwardly. Optionally, the step of maintaining the orientation of the vehicle relative to the horizon comprises the step of synchronously driving the vertical drive elements.

According to another aspect, a method for delivering items to a storage assembly may include the step of transferring an item between a vehicle and a storage location by actuating a transfer mechanism on the vehicle. Optionally, the step of actuating a transfer mechanism comprises extending a transfer mechanism horizontally toward the one storage location. Optionally, the transfer mechanism may be connected with a horizontal drive system and the step of actuating a transfer mechanism comprises driving the horizontal drive system.

According to a further aspect, a method for delivering items to a storage assembly may include the step of actuating a horizontal drive system of a vehicle to drive the vehicle with a moveable track by driving the vehicle horizontally while the moveable track is lifted off the ground. Optionally, the step of driving the vehicle horizontally while the moveable track is lifted off the ground includes the steps of identifying a column of the storage assembly in which the one storage location is located; and aligning the moveable track with the column so that a transfer opening in the moveable track aligns with an opening in the column. Optionally, the step of transferring comprises transferring the item through the transfer opening.

The present invention provides a number of inventive aspects that relate to material handling systems and/or storage and retrieval systems.

For instance, according to one aspect, the present invention provides a material handling system that includes a storage assembly a vehicle and a moveable track. The storage assembly may have a plurality of elevated storage locations for storing items. The vehicle may be configured to deliver items to the storage locations and retrieve items from the storage locations, wherein the vehicle comprises a first driving assembly for driving the vehicle in a horizontal direction and second driving assembly. The moveable may have an opening configured to receive a portion of the vehicle. Additionally, the moveable track may include an element for engaging the second driving system of the vehicle. The engagement element may cooperate with the second driving system so that driving the second driving system in a first direction is operable to lift the moveable track off the ground and so that driving the second system in a second direction is operable to drive the vehicle vertically upwardly to an elevated position. Optionally, the vehicle is configured to drive the vehicle along a horizontal surface to a location adjacent the storage assembly. Additionally, the vehicle may include a transfer means configured to transfer an item between the vehicle and a storage location of the storage assembly while the vehicle is in the elevated position adjacent the storage location.

According to another aspect, the present invention provides a material handling system cooperable with a storage assembly having a plurality of storage locations for storing a plurality of items. The system may include a vehicle and a moveable track. The vehicle may include a horizontal drive assembly configured to drive the vehicle horizontally along the ground and a vertical drive assembly configured to drive the vehicle vertically upwardly. The vehicle may also include a transfer mechanism for transferring items between the vehicle and the storage locations. The vehicle may further include a power source for powering the horizontal drive assembly and the vertical drive assembly. The moveable track optionally includes a vertical track cooperable with the vertical drive assembly of the vehicle and a support structure configured to support the vertical track in a vertical orientation. The moveable track may include an opening configured to receive at least a portion of the vehicle. The vertical drive assembly and the vertical track may be configured and positioned so that when the vehicle extends into the opening in the moveable track, the vertical drive assembly engages the vertical track, such that driving the vertical drive in a first direction is operable to raise the moveable track. Optionally, driving the vertical drive assembly in a second direction may be operable to drive the vehicle up the track to an elevated position to facilitate transfer of an item between a storage location and the vehicle. Additionally, the support structure may be configured to support the vehicle when the vehicle is in the elevated position on the vertical track.

According to a further aspect, a material handling system may include a vehicle and a moveable track having a support structure that includes a frame forming a column having an opening for receiving the vehicle.

According to a further aspect, a material handling system may include a moveable track having a connector for releasably connecting the moveable track with a storage assembly. Optionally, the connector is configured to impede displacement of the moveable track relative to the storage assembly along at least one horizontal axis. Additionally, the connector may be configured so that relative vertical displacement between the moveable frame and the storage assembly connects the connector with the storage assembly. Further, the connector may be configured such that vertical displacement of the connector relative to the storage assembly is operable to disconnect the moveable track from the storage assembly.

According to a further aspect, a material handling system may include a vehicle having a vertical drive system for driving the vehicle vertically up a moveable track and the vertical drive assembly may be configured to maintain the orientation of the vehicle relative to the horizon as the vehicle is driven upwardly. Optionally, the moveable track includes a plurality of track sections extending vertically upwardly and the vertical drive assembly includes a plurality of vertical drive elements interconnected so that operating the vertical drive assembly synchronously drives the vehicle up the track sections to maintain the horizontal orientation of the vehicle.

According to a further aspect, a material handling system may include a vehicle having a horizontal drive assembly for driving the vehicle in a horizontal direction and a transfer mechanism. The transfer mechanism may be connected with one of the horizontal drive assembly so that driving the horizontal drive assembly is operable to drive the transfer mechanism away from the vehicle toward a storage location. Optionally, the system includes a clutch for selectively engaging and disengaging the transfer mechanism with the horizontal drive assembly.

According to another aspect, a material handling system may include a vehicle having a vertical drive system and a moveable track having a support structure. The vertical drive may project outwardly from the vehicle and the support structure may include gaps configured to align with the vertical drive system to facilitate the vehicle driving into the support structure. Optionally, the moveable track includes a vertical track and the vertical track has an upper section and a lower section each including a plurality of teeth configured to cooperate with the vertical drive assembly. The upper section and lower section may have similar pitch between teeth and the lower section may have gaps between adjacent teeth to provide clearance to facilitate the vertical drive driving through the lower section. Optionally, the vertical drive assembly includes a plurality of spur gears having a tooth pitch and each spur gear is rotatable about an axis. The axes of the spur gear may be substantially parallel. Additionally, the spacing between the teeth of the lower section may provide sufficient clearance for the teeth of the spur gears to pass between the gaps when the spur gears translate horizontally along a line that is parallel to the axis of rotation of the spur gears. Optionally, the spur gears and the vertical track are configured and positioned so that an addendum circle of the spur gears overlaps with the addendum line of the teeth in the track. Additionally, the vertical track may include an upper section and a lower section wherein the upper section has an upper tooth profile having an upper root and an upper dendendum and the lower section has a lower tooth profile having a lower root and a lower dendendum that is greater than the upper dedendum so that the lower root of the teeth extends inwardly away from the vertical drive assembly a greater distance than the upper root.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

FIG. 2D is a front elevation view of the vehicle depicted in FIG. 2A;

FIG. 2E is a rear elevation view of the vehicle depicted in FIG. 2A;

FIG. 2F is a side elevation view of the vehicle depicted in FIG. 2A;

FIG. 5A is a side elevation of a moveable rack of the material handling system illustrated in FIG. 1;

FIG. 5B is a front elevational view of the moveable rack illustrated in FIG. 5A;

Figure 1:
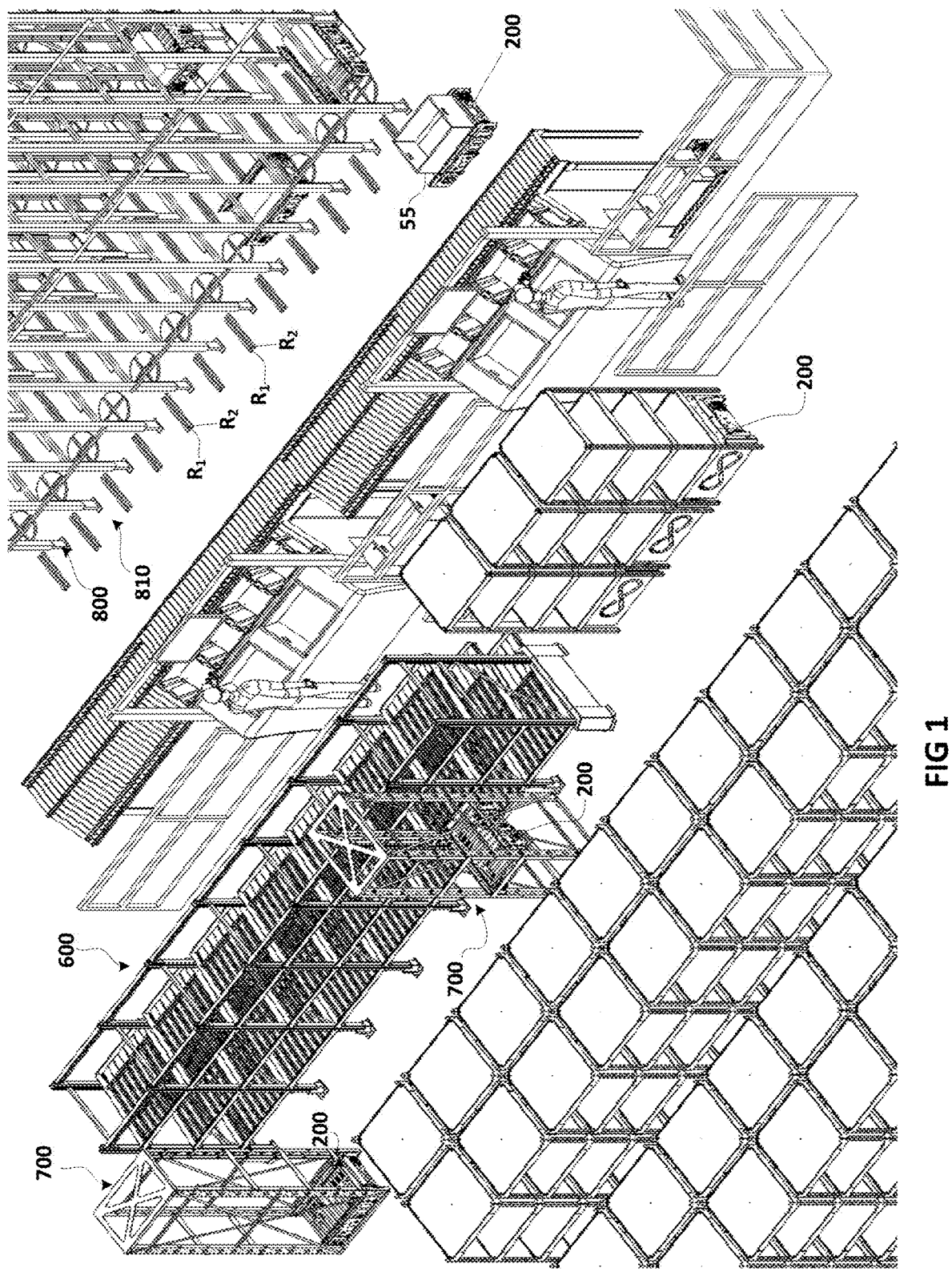
FIG. 1 is a perspective view of a material handling system.

While the systems and methods are described herein by way of example for several embodiments and illustrative drawings, those skilled in the art will recognize that systems and methods for performing respective subsets of inventory management tasks using corresponding functional accessory modules are not limited to the embodiments or drawings described. It should be understood that the drawings and detailed description thereto are not intended to limit embodiments to the particular form disclosed. Rather, the intention is to cover all modifications, equivalents and alternatives falling within the spirit and scope of the systems and methods for performing respective subsets of inventory management tasks using corresponding functional accessory modules defined by the appended claims. Any headings used herein are for organizational purposes only and are not meant to limit the scope of the description or the claims. As used herein, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF EMBODIMENTS

Various embodiments of a method and apparatus for performing inventory management tasks in an inventory management system are described. In the following detailed description, numerous specific details are set forth to provide a thorough understanding of claimed subject matter. However, it will be understood by those skilled in the art that claimed subject matter may be practiced without these specific details. In other instances, methods, apparatuses or systems that would be known by one of ordinary skill have not been described in detail so as not to obscure claimed subject matter.

Some portions of the detailed description that follow are presented in terms of algorithms or symbolic representations of operations on binary digital signals stored within a memory of a specific apparatus or special purpose computing device or platform. In the context of this particular specification, the term specific apparatus or the like may include a general-purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and is generally, considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these or similar terms are to be associated with appropriate physical quantities and are merely convenient labels.

Unless specifically stated otherwise, as apparent from the following discussion, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

Reference will now be made in detail to exemplary embodiments of the present invention, examples of which are illustrated in the accompanying drawings. Wherever possible, the same reference numbers will be used throughout the drawings to refer to the same or like parts.

Referring now to the figures in general and to FIG. 1 specifically, an apparatus for sorting or retrieving items is designated generally 10. The apparatus 10 includes one or more mechanisms for delivering items to and/or retrieving items from one of a plurality of locations, such as storage areas located in racks 800 or flow racks 600. The delivery mechanism may include one or more vehicles 200 that transport items. For instance, optionally, the vehicles may retrieve items from storage locations 820 in the racks 800 and deliver the items to a workstation 500 where an operator can retrieve the item from the vehicle. The vehicle may optionally return to a storage area in the rack to store any remaining items that were not retrieved by the operator. The vehicle can then advance to another storage area to obtain the next item to be retrieved. In this way, the system may include a mechanism for continuously storing and retrieving items to/from the various storage areas so that the items can be presented to an operator. Optionally, a guide, such as a track, may be positioned adjacent the rack so that the vehicle may climb the rack vertically to retrieve an item from the rack. Optionally, the system may include a moveable rack that is configured to be transported by the vehicles. The vehicles may transport the moveable rack into position adjacent a storage rack. The vehicle may then climb the rack vertically to transfer items between the vehicle and a storage location in the storage rack.

It should be understood that various items and subassemblies of the overall system can be used alone or in combination with material handling systems having different structure or operation to the system illustrated in the Figures and described below.

Figure 7:
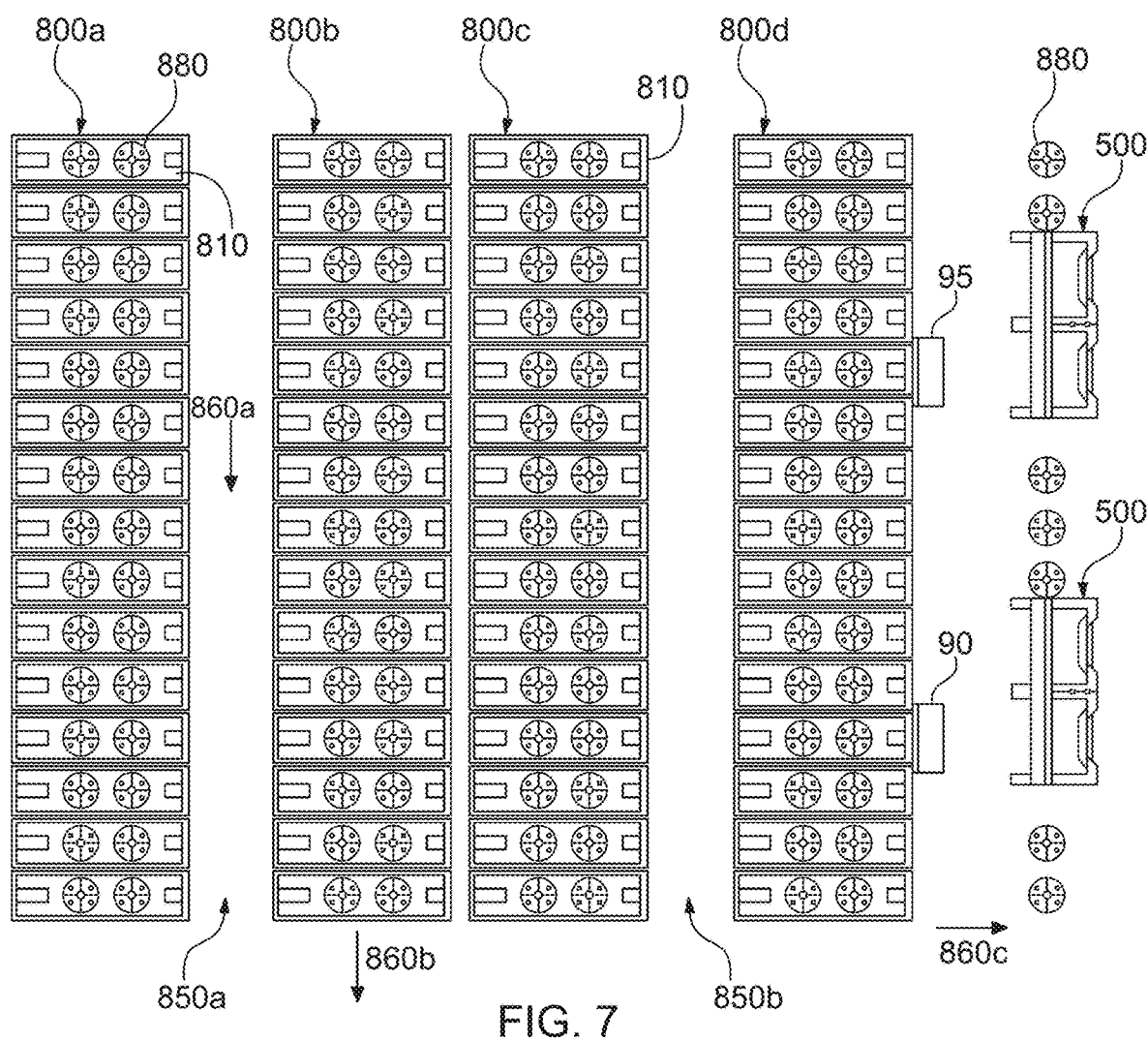
FIG. 7 is an enlarged fragmentary perspective view of a rack portion of the material handling system illustrated in FIG. 1.

As illustrated in FIGS. 1 and 7, the material handling system may optionally incorporate one or more storage racks 800. Each storage rack may include a plurality of storage locations 820. Optionally, the storage locations may be arranged into one or more vertical columns 810. For instance, FIG. 1 illustrates a plurality of racks 800 and each rack may include a plurality of columns 810, each of which includes a plurality of storage locations. The items that are handled by the system may be stored directly in the storage locations. Alternatively, the items may be stored in bins or totes 55 and the storage locations 820 may be configured to store the totes 55 as shown in FIGS. 1 and 7-9. Accordingly, it should be understood that unless stated otherwise in the following description, when a tote is mentioned, the term tote is broad enough to include a container for containing one or more items as well as simply being an item that is not necessarily contained in a container. Although the present system is described as using totes, it should be understood that any of a variety of storage mechanisms can be used, such as pallets or similar platforms.

Vehicles

FIGS. 2A-2I illustrate details of one of the vehicles 200 that are shown in FIG. 1. As noted above, if the system incorporates vehicles, the structure of the vehicle may vary. Accordingly, it should be understood that each of the vehicle's features discussed below are optional features that may be varied or eliminated depending on the application.

The vehicles 200 may be autonomous systems that include an onboard power supply for driving the vehicle. The vehicles may also include a communication system for wirelessly receiving and transmitting control signals between each vehicle and a control element, such as the central controller 450. In this way, the vehicle may receive control signals regarding the location for retrieving an item and the location to which the vehicle is to deliver the item.

Referring now to FIGS. 2A to 2I, there is shown an automated guided vehicle 200 constructed in accordance with embodiments of the present disclosure and adapted to perform inventory management tasks in, for example, any of the material handling systems depicted in FIG. 1. Each delivery vehicle may be an automated guided vehicle having a first motorized drive system and a second motorized drive system, as well as an onboard power supply.

As discussed further below, the vehicle may include a horizontal drive assembly for driving the vehicle 200 in a horizontal direction. The horizontal drive may be configured to drive the vehicle along a track or along an open horizontal surface, such as a floor. For instance, one option for a horizontal drive includes a plurality of rotatable elements, such as wheels or rollers. One or more drive mechanisms may be provided for turning the rotatable elements. Additionally, the rotatable elements may turn from side to side to steer the vehicle.

The vehicle illustrated in FIGS. 2A-4E includes a horizontal drive assembly for driving the vehicle 200 in a horizontal direction. The horizontal drive may be configured to drive the vehicle along a track or along an open horizontal surface, such as a floor. For instance, one option for a horizontal drive includes a plurality of rotatable elements, such as wheels or rollers. One or more drive mechanisms may be provided for turning the rotatable elements. Additionally, the rotatable elements may turn from side to side to steer the vehicle.

As noted above, the vehicle 200 may have any of a variety of steering mechanisms for controlling the direction of travel of the vehicle. For example, an optional steering mechanism is a zero-turn mechanism that can turn the vehicle without substantially moving forwardly. Optionally, the zero-turn mechanism provides a means for turning the vehicle about a vertical axis extending through the vehicle.

The zero-turn mechanism comprises a linkage that allows the wheels or rollers on one side of the vehicle to rotate at a different speed than the wheels or rollers on the opposing side of the vehicle. Optionally, the linkage allows the wheels or rollers on one side of the vehicle to rotate in different directions than the wheels or rollers on the opposing side of the vehicle. In this way, by varying the speed and/or rotational direction of the wheels on one side of the vehicle relative to the speed and/or rotational direction of the wheels on the opposing side of the vehicle, the zero-turn mechanism changes the direction of travel to steer the vehicle.

For instance, as illustrated in FIGS. 2A-4E, the vehicle may have a horizontal drive formed of a plurality of rollers 252, 254, 256 that are rotatable around a first axis, such as around an axle. Additionally, each of the rollers 252, 254, 256 may be constrained to rotation about a single axis. For example, the horizontal drive may include a pair of central rollers 252a,b and first and second sets of outer rollers 254a,b, 256a,b. The first set 254a,b may be positioned forwardly of the central rollers 252a,b while the second set of rollers 256a,b may be positioned rearwardly of the central rollers. Optionally, each set of outer rollers 254a,b and 256a,b may include a pair of rollers on each side of the vehicle as shown in FIG. 2E.

Figure 2A:
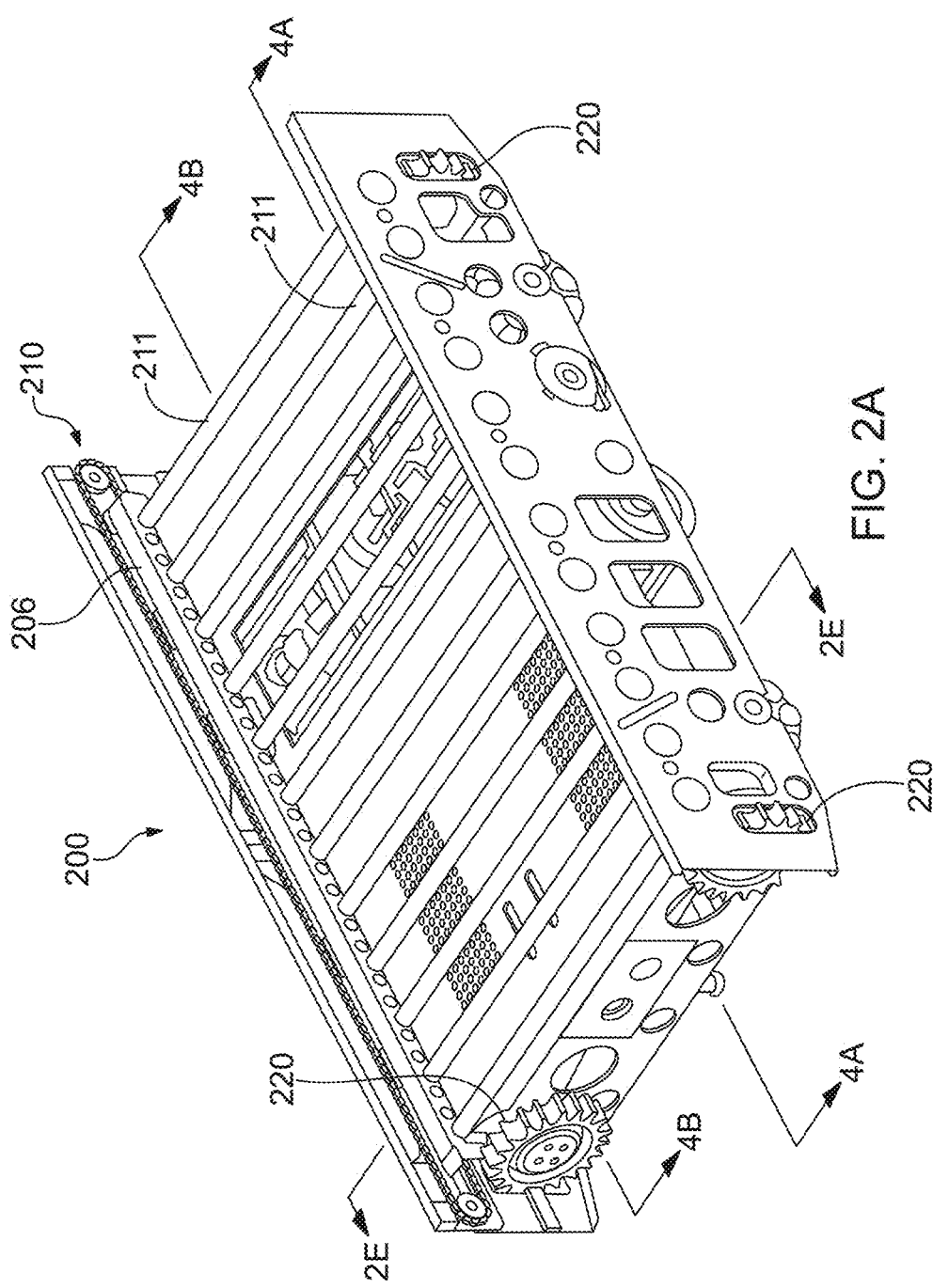
FIG. 2A is a perspective view of an automated guided of the material handling system illustrated in FIG. 1.
Figure 2B:
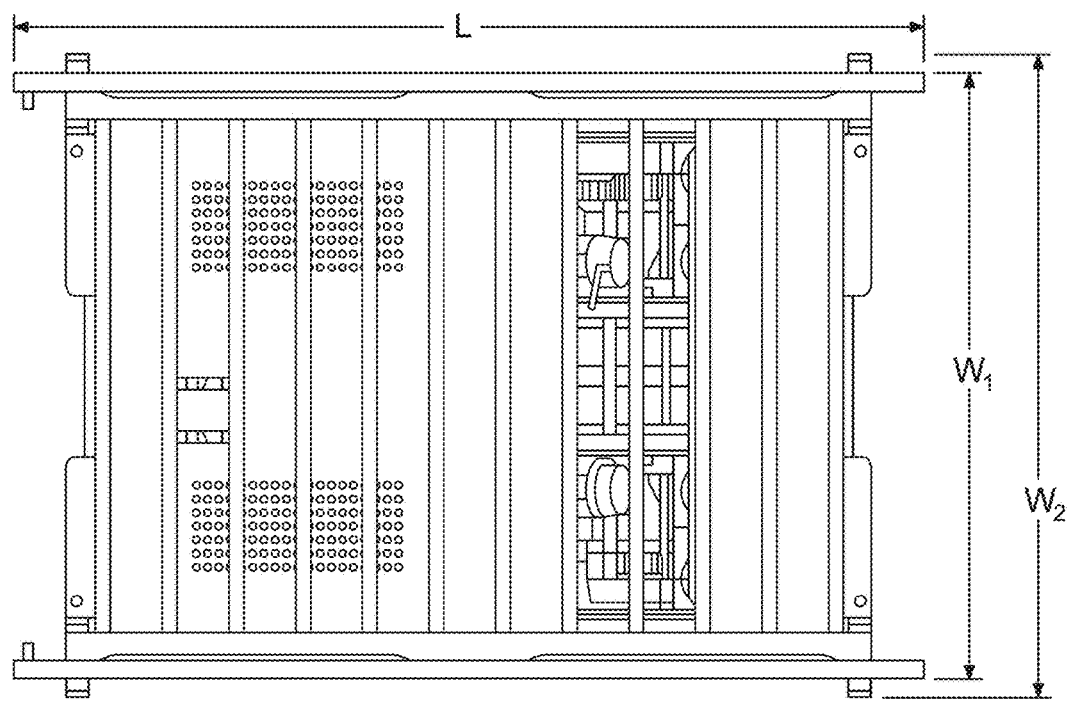
FIG. 2B is a plan view of the vehicle illustrated in FIG. 2A.
Figure 2C:
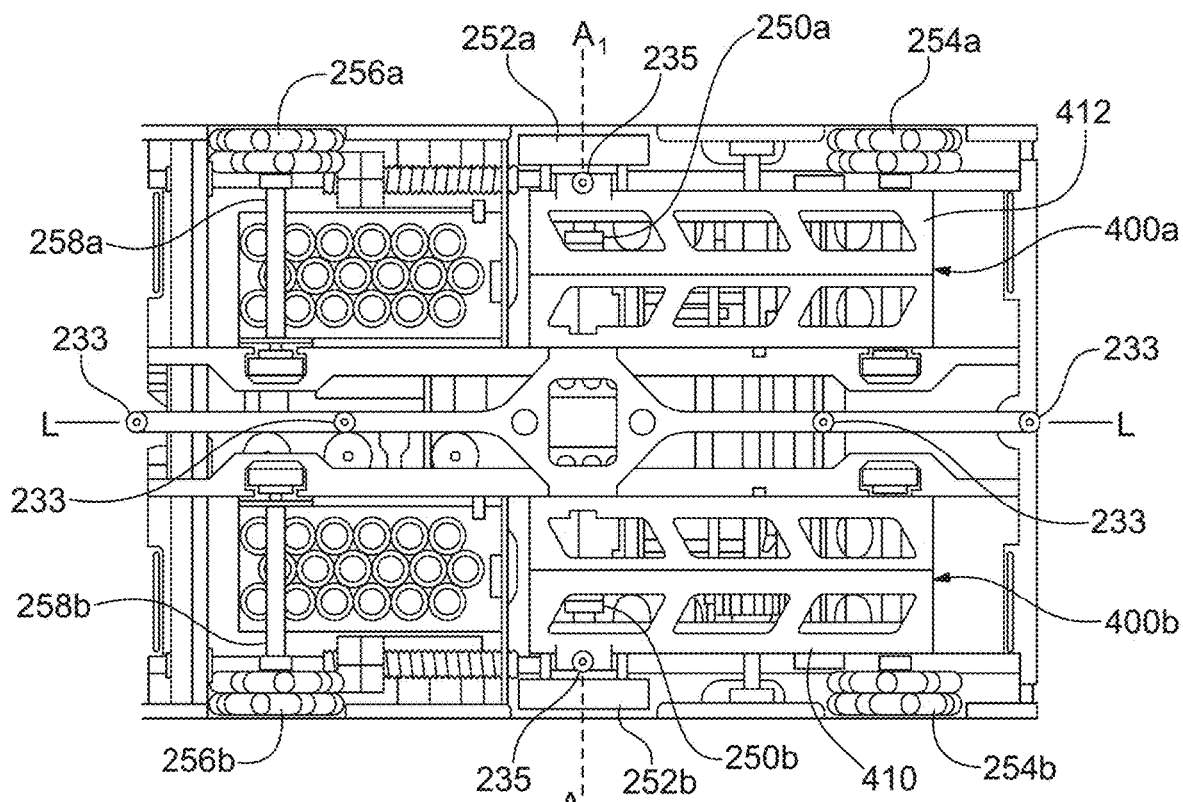
FIG. 2C is a bottom view of the vehicle illustrated in FIG. 2A.

With particular reference to FIGS. 2C and 2F, the details of the horizontal drive system will be described. However, it should be understood that a variety of elements and configurations can be incorporated to provide a horizontal drive system. Accordingly, the following description is merely one example of a horizontal drive system. As shown in FIG. 2C, vehicle 200 further includes a second drive system which is dimensioned and arranged to propel vehicle 200 upon an underlying support surface—such as the floor of a warehouse or distribution center. In the illustrative embodiment of FIG. 2C, the second drive system includes a second motor of vehicle 200, indicated generally at 250a, and a third motor of vehicle 200, indicated generally at 250b. By dynamically controlling the relative speed and/or direction of rotation of each of motors 250a and 250b, vehicle 200 can be driven in any direction upon an underlying support surface, as surface S depicted in FIG. 2F.

With continued reference to FIG. 2C, it will be seen that the second drive system of vehicle 200 includes a first drive element 252a driven by second motor 250a to rotate about a first axis of rotation $A_1$, and a second drive element 252b driven by third motor 250b to rotate about a second axis of rotation $A_2$. Each of the first and second drive elements 252a and 252b is respectively dimensioned and arranged to engage a respective portion of underlying support surface S for movement of the vehicle thereupon. In embodiments of a vehicle exemplified by FIGS. 2C and 2F, the first axis of rotation $A_1$ and the second axis of rotation $A_2$ are co-axial while drive elements 252a and 252b are supported by a planar, horizontal surface. In this instance, the second drive system of vehicles 200 optionally includes a plurality of omnidirectional wheels comprising a first pair of wheels 254a and 254b and a second pair of wheels 256a and 256. The omnidirectional wheels may be dimensioned and arranged to frictionally engage respective portions of the underlying surface S (FIG. 2F), with each of wheels 254a, 254b, 256a and 256b being secured to a corresponding drive axle as axles 258a and 258b, respectively.

Figure 8:
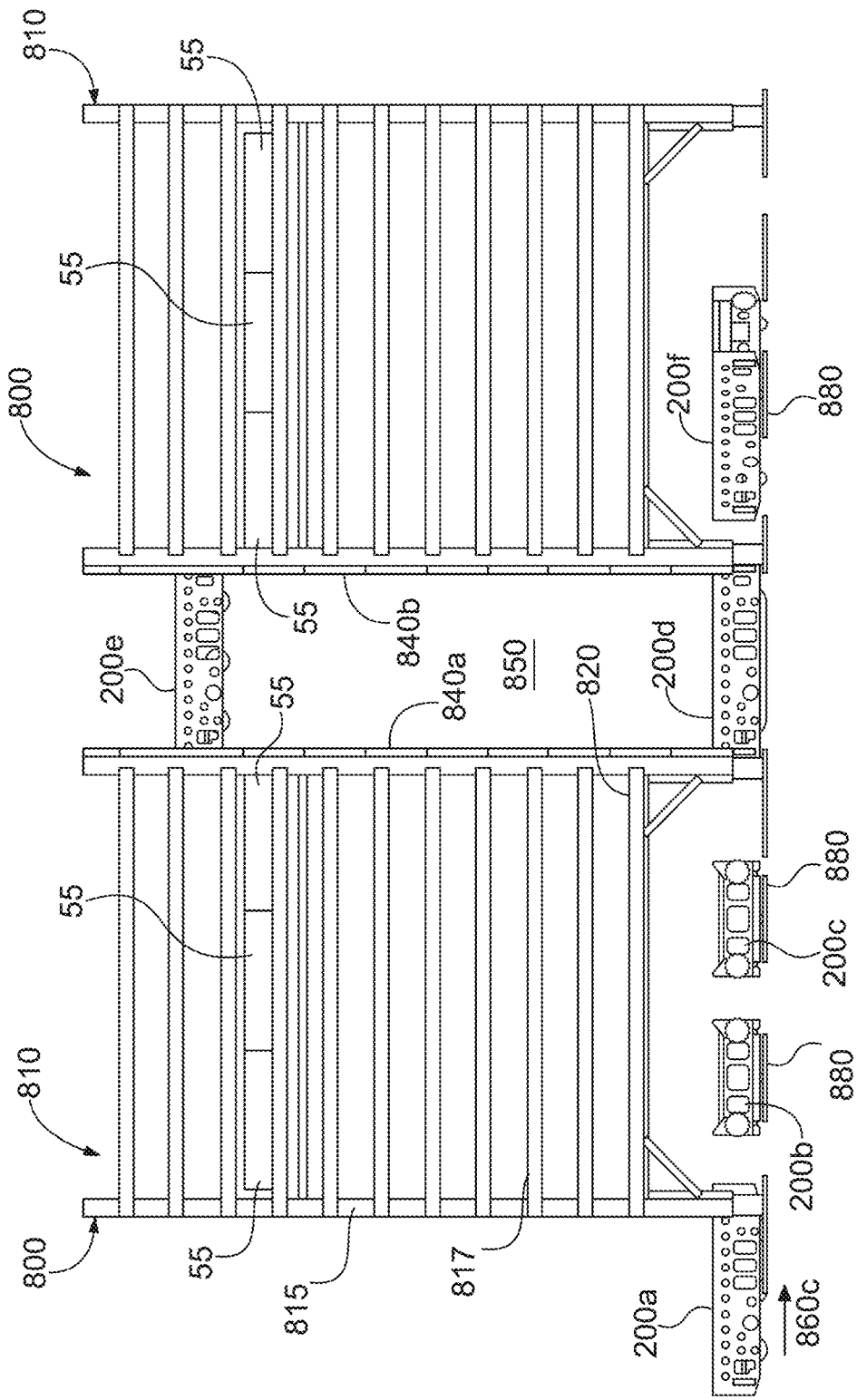
FIG. 8 is a front elevational view of an aisle of a rack system of the material handling system illustrated in FIG. 1.
Figure 9:
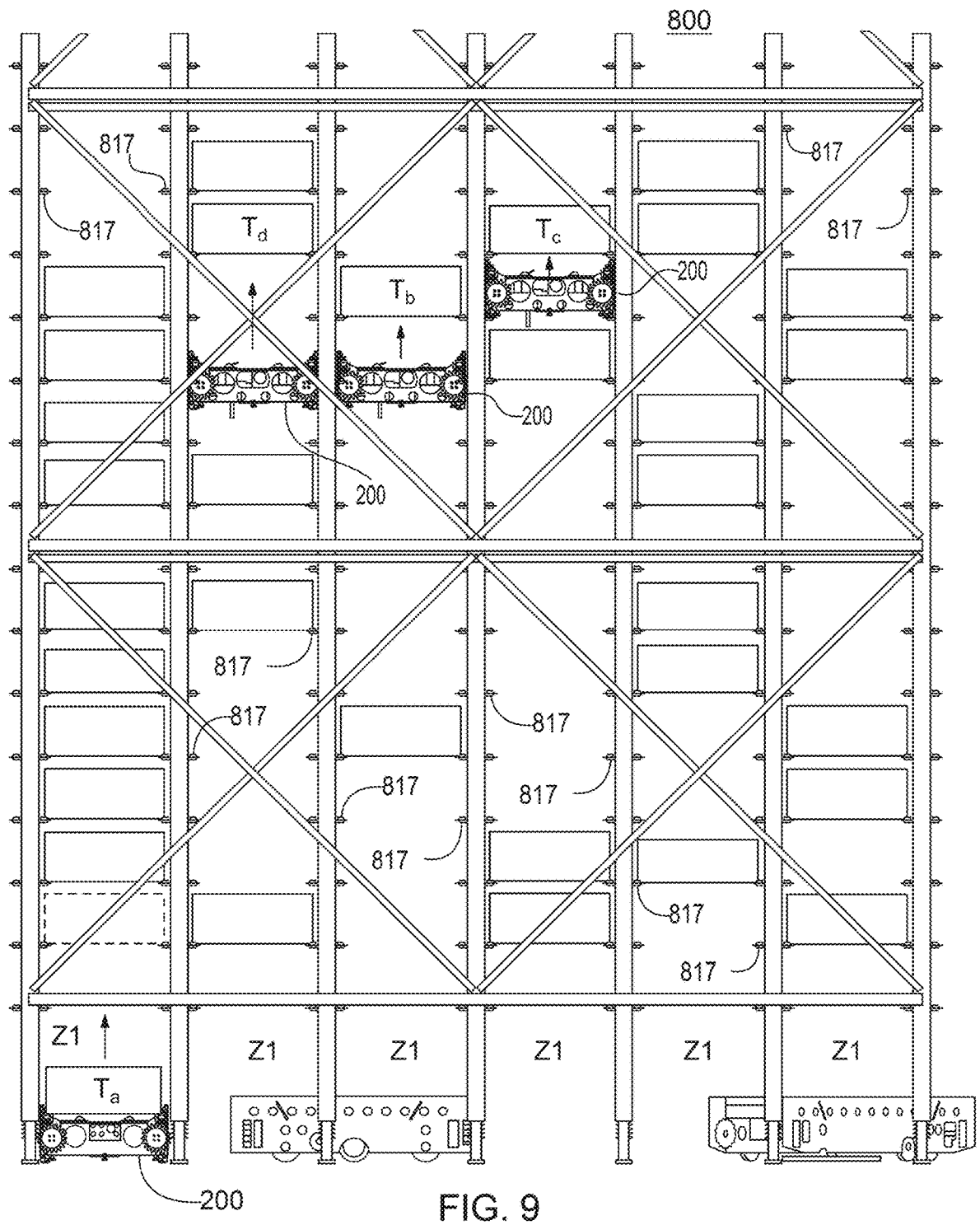
FIG. 9 is a side elevational view of the aisle illustrated in FIG. 8.
Figure 10:
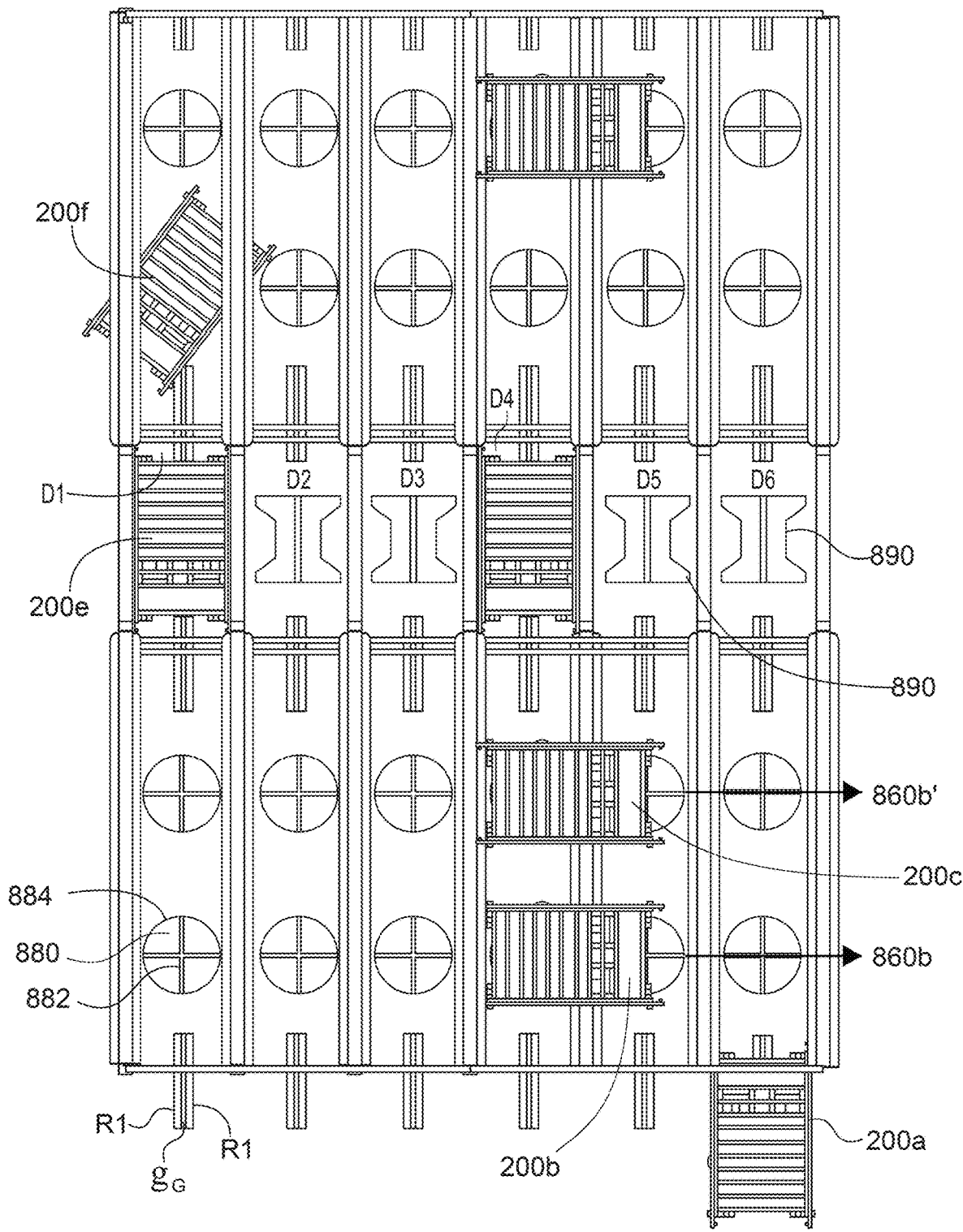
FIG. 10 is a plan view of the aisle illustrated in FIG. 8.

With particular reference to FIGS. 2C and 2D to 2F, it will be seen that the vehicle 200 may also incorporate a series of guides 233, 235 which downwardly depend from shafts. Each of the guides 233 is rotatably mounted to the lower part of a shaft. The guides 233, 235 facilitate alignment of vehicle 212 as it is maneuvered upon an underlying support surface and brought into alignment with one or more other structures it may enter in the course of performing an assigned inventory management task. In FIG. 2C, for example, it can be seen that some of the guides 233, 235 are arranged along a longitudinal center line L of vehicle 200. FIG. 2E depicts alignment of guide 235 within a pair of parallel rails, shown in cross section and mounted upon underlying support surface S. In an exemplary application, rails $R_1$ and $R_2$ are arranged along a path by which vehicle 200 enters, exits, and/or maneuvers beneath a vertical array of storage cells, as depicted in FIGS. 8-10.

Referring to FIGS. 2A and 2D to 2F, the vertical drive system of vehicle 200 optionally includes a plurality of drive elements, such as gears 220 that are driven to transport the vehicle along a vertical guide, such as a track. The gears 220 are mounted onto two parallel spaced apart axles 215 (see FIG. 2F), so that two of the gears are disposed along the forward edge of the vehicle and two of the gears are disposed along the rearward edge of the vehicle.

Figure 3A:
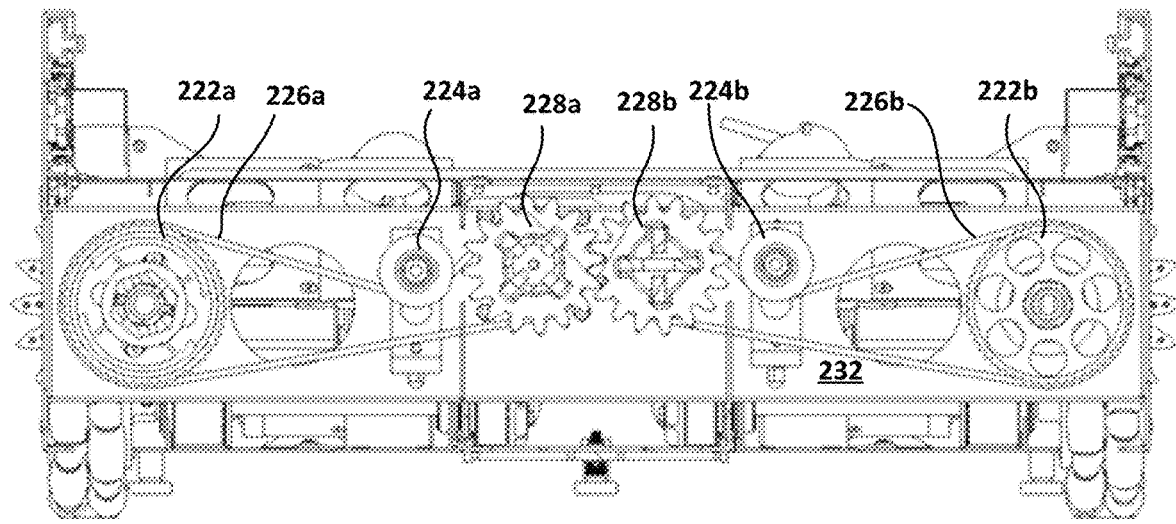
FIG. 3A is a section view of the vehicle of FIG. 2A taken across line IIIA-IIIA.
Figure 3B:
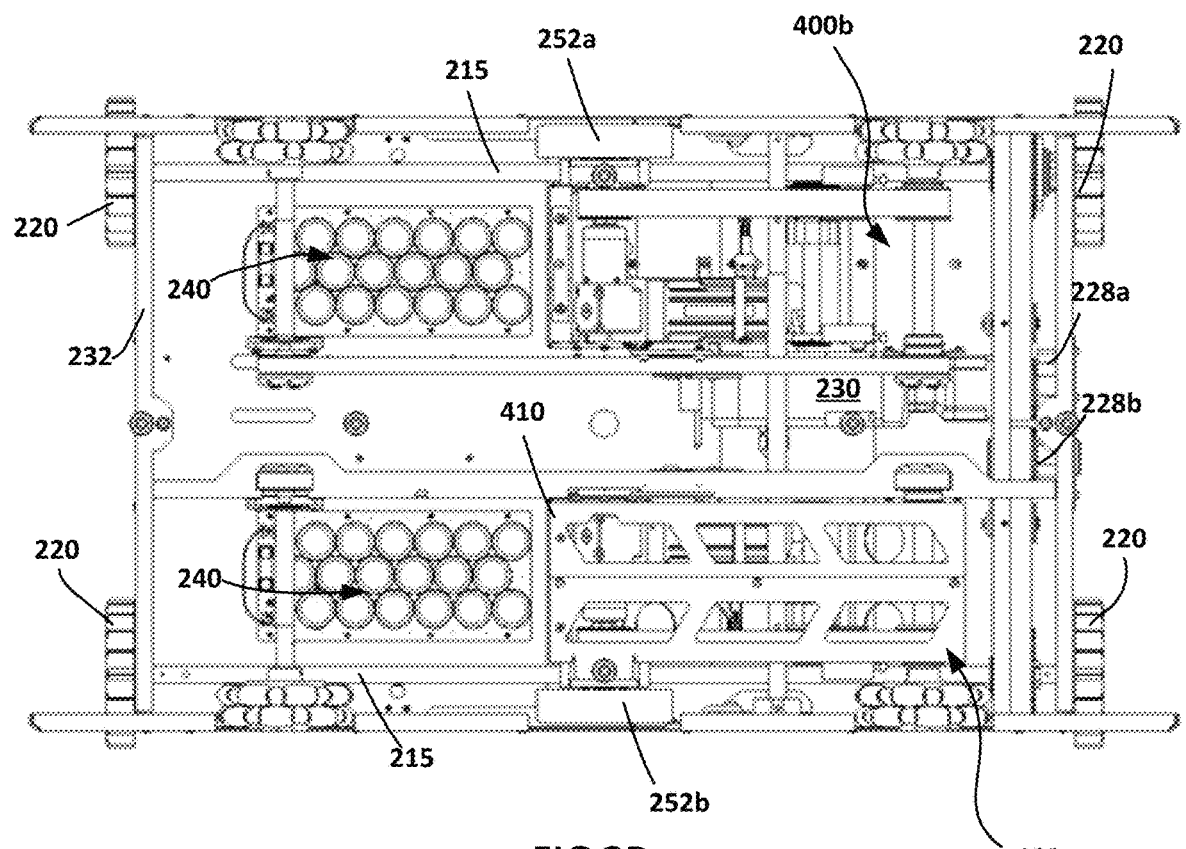
FIG. 3B is partially broken away bottom view of the vehicle of FIG. 2A.

Turning now to FIGS. 3A and 3B, FIG. 3A is a forward elevation view of the exemplary automated guided vehicle of FIGS. 2A-2F, taken in cross section across line IIIA-IIIA in FIG. 2A, and FIG. 3B is bottom plan view of the exemplary automated guided vehicle FIGS. 2A-2F. As best seen in FIG. 3A, the first drive system further includes a pair of inner idler pulleys 224a, 224b, and a pair of outer pulleys 222a, 222b that, when driven by respective belts 226a, 226b, cause the geared wheel 220 mounted on the same shaft to rotate and thereby propel the vehicle 200 in a vertical direction within a column (along the drive surfaces of the track). The idler pulleys 224a and 224b rotate freely relative to the axles and maintain the tension of the belts 226a and 226b. Each of the outer pulleys 222a and 222b is fixed relative to the axle 215 onto which it is mounted. The first drive system further includes a pair of counter-rotating gears 228a, 228b which are rotated by first onboard motor 230 (FIG. 3B). So driven, belts 226a and 226b drive pulleys 222a and 222b, respectively and this rotary motion of the pulleys 222a and 222b causes rotation of the geared wheels 200 mounted on a corresponding shaft 215. Accordingly, when the vehicle 200 is moving vertically, the geared wheels 220 carry the weight of the vehicle and any item(s) thereon.

In the embodiments of FIGS. 3A and 3B, the drive axles 215 are rotatably mounted within housing 232 such that their spacing remains fixed relative to one another. As will be described shortly, the fixed spacing between axles 215 in accordance with some embodiments necessitates an alignment step with the guiding system (e.g., tracks) before entry of a vehicle into the columns which extend between the vertical arrays of storage areas 115 (FIG. 1) and within which the guide system is mounted.

In alternate embodiments (not shown), elements of the first drive system, as geared wheels 200 and axles 215 may be mounted within housing 232 in a manner that allows them to move inwardly so as to relax any requirement for precise alignment while also eliminating the risk of any damage to either the geared wheels 200 or to the guiding system. In embodiments of the latter type, vehicles intended to carry substantial loads may require motor driven means for temporarily reducing the spacing between axles 215 and thereby accommodate entry of a vehicle 200 into the column(s) between storage areas.

With continued reference to FIGS. 3A and 3B, it will be seen that first motor 230 is operatively connected with the gears 228a and 228b to drive belts 226a, 226b and rotate both axles 215 and corresponding geared wheels 220 in a synchronous manner. The first drive system for the vehicle 200 is thus configured to synchronously drive the vehicle 200 in a vertical direction relative to a track or other guiding system. Specifically, each geared wheel 200 is connected to an end of one of the axles 215 in a manner that substantially impedes rotation of the gears relative to the axle. In this way each axle drives the attached two gears in a synchronous manner. Additionally, in the present instance, both axles are driven in a synchronous manner so that all four gears are driven in a synchronous manner.

In embodiments, a single drive motor 230 is used to drive both axles. In this instance, pulleys 222a and 222b serve as timing pulleys rigidly connected to the axles 215 to prevent rotation of the pulley relative to the axle. Similarly, timing pulleys (not shown) are connected to the counter rotating gears 228a and 228b driven by motor 230. In this instance, drive belt 226a connects the timing pulley 222a with the timing pulley directly driven, via gear 228a, by motor 230, while the drive belt 226b connects the timing pulley 222b with the timing pulley indirectly driven, via gear 228b, by motor 230. In embodiments, belts 226a and 226b are each timing belts such that rotation of the drive motor 230 is precisely linked to the rotation of the axle.

There are various other mechanisms that can be used to synchronously drive the axles 215 other than the single-motor arrangement exemplified by FIGS. 3A and 3B. For instance, a pair of drive motors can be used to drive the axles, and the drive motors can be synchronized. In embodiments, the drive motor 230 includes a sensor that is operable to detect the rotation of the motor to thereby determine the distance the vehicle has traveled. Since the gears 200 are rigidly connected with the axles, which are in turn synchronously connected with the drive motor 230, the vertical distance that the vehicle moves can be exactly controlled to correlate to the distance that the drive motor 230 is displaced. For instance, the sensor 252 may be a sensor such as a hall sensor. The sensor detects the rotation of the motor and sends a signal to a central processor, which determines how far along the designated path the vehicle 200 has traveled based on the known information regarding the path and the rotation that the sensor detects for the motor.

The vehicle may also include an optional transfer mechanism for transferring items between the vehicle and a destination, such as a storage location.

For instance, the transfer mechanism 210 may be operative to transfer an item between a platform surface of the vehicle and one of the plurality of destination areas 810. As shown in FIG. 2A, the platform surface is optionally defined by the exterior surfaces of a plurality of rollers, indicated generally at 211.

The transfer mechanism 210 may be any of a variety of mechanisms for loading items onto the vehicle and for unloading items from the vehicle into one of the storage areas. Additionally, the transfer mechanism 210 may be specifically tailored for a particular application. In the present instance, the transfer mechanism 210 comprises one or more displaceable element(s) configured to engage an item stored at a storage location and pull the item onto the vehicle. More specifically, in the present instance, the vehicle includes one or more displaceable element(s) configured to move toward a tote in a storage location and releasably engage the tote. After the displaceable element(s) engage the tote, each displaceable element is displaced away from the storage location, thereby pulling the tote onto the vehicle 200.

The displaceable element of the transfer mechanism may any of a variety of items, such as a bar, rod, or another element configured to engage an item, for example, a tote. For example, referring to FIGS. 2A, 2B, and 2G to 2I, the transfer mechanism 210 may include one or more displaceable pins 212a, 212b. Additionally, the transfer mechanism may include a drive element for displacing the pins 212a, 212b. For instance, optionally, the transfer mechanism 210 includes two drive elements in the form of endless carriers such as a drive belt or as shown drive chains 214a and 214b. Optionally, each pin 212a, 212b projects or extends inwardly toward the longitudinal center line of the vehicle. The transfer mechanism is preferable configured to cooperate one of the totes to releasably engage the tote. For example, in the present instance, the pins 212a, 212b are configured to mate with a recess on the tote so that the transfer mechanism can engage the tote. However, it should be recognized that the transfer mechanism may include any of a variety of elements for engaging items to be transferred onto of off of the vehicle.

The vehicle includes one or more drive elements for driving the transfer mechanism. Optionally, the vehicle includes one or more motors that drive the transfer mechanism 210. For instance, one or more motors of the vehicle drive system may drive the chains 214a, 214b to selectively move the chains and pins 212a and 212b toward or away from storage locations.

Figure 2G:
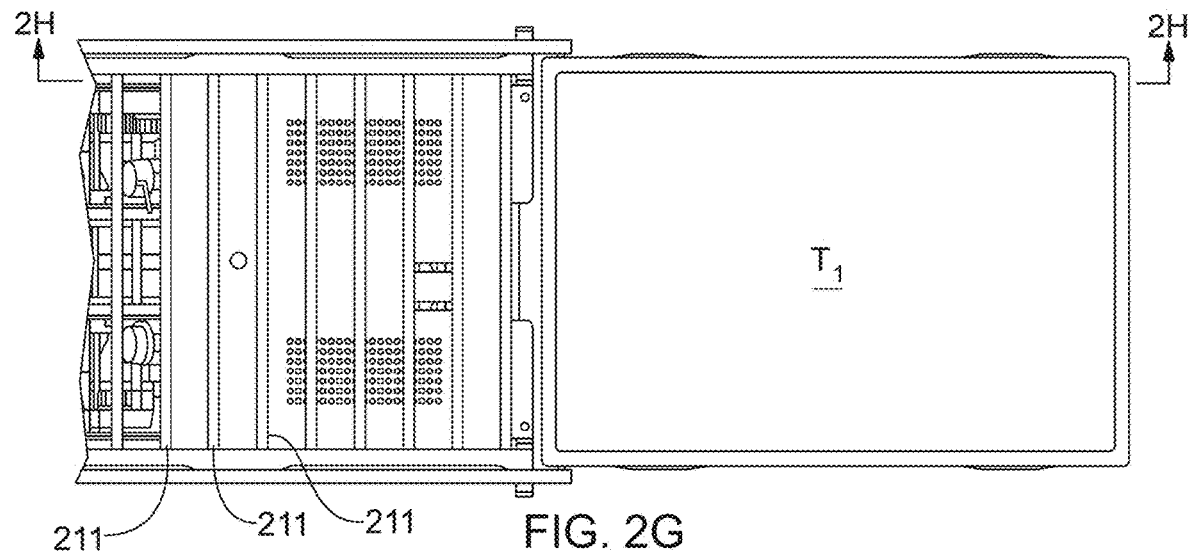
FIG. 2G is a plan view of the vehicle illustrated in FIG. 2A with a portion of a rack of the system illustrated in FIG. 1.

As the vehicle approaches a storage location to retrieve a tote T (FIGS. 2G to 2I), the chains may drive the displaceable pins 212a and 212b toward the storage location so that the pins underlie a groove or notch in the bottom of the tote. The vehicle travels a small distance upward until the pins 212a and 212b (or bar) are disposed with the groove or notch, as shown in FIG. 2I. The chain then reverses so that the pins 212a, 212b move away from the storage location 100. Since the pins engage tote T within the notch, as the pins moves away from the storage location, the tote is pulled onto a surface of the vehicle. In this way, the transfer mechanism 210 is operable to retrieve items from a storage location. Similarly, to store an item in a storage location as location 820 in FIG. 7, the chains 214a, 214b of the transfer mechanism 210 drives the pins 212 toward the storage location until the item is in the storage location. The vehicle then moves downwardly to disengage the pins from the tote, thereby releasing the tote.

Figure 2H:
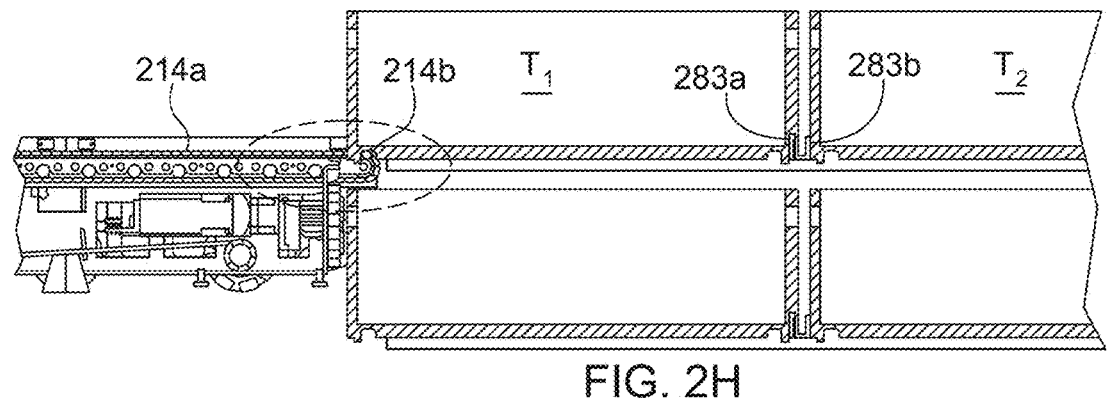
FIG. 2H is a cross-sectional taken across line II-H in FIG. 2G.
Figure 2I:
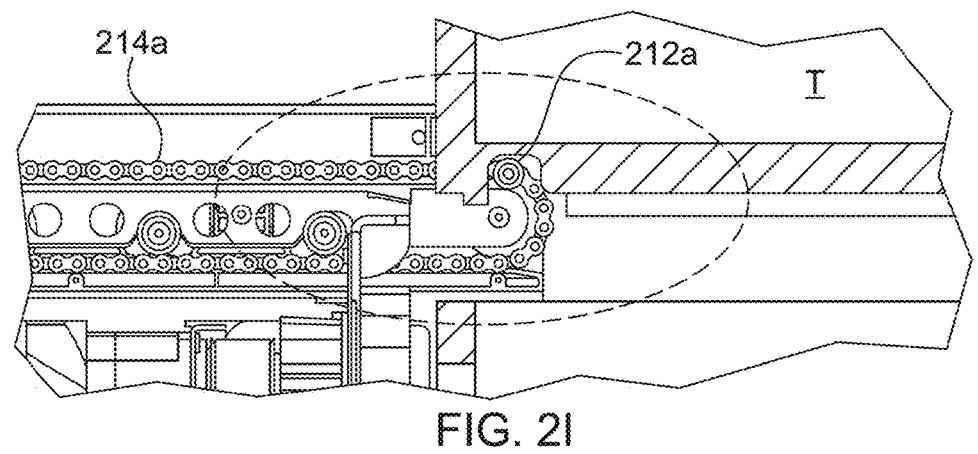
FIG. 2I is an enlarged fragmentary view of the vehicle and rack illustrated in FIG. 2H.

In this instance, and as best seen in FIG. 2H, two or more totes, such as totes $T_1$ and $T_2$, may be coupled and decoupled from one another using mating connectors indicated generally as 283a and 283b, respectively. Optionally, totes $T_1$ and $T_2$ may be coupled and decoupled from one another through a series of lifting and separating movements implemented by movement of the vehicle 210. Optionally, the transfer mechanism 210 may be actuated to pull a forward facing ("lead") tote onto rollers 211 (FIG. 2G) so as to be fully supported by vehicle 200. If the totes are releasably connected, this pulling motion advances the trailing tote (i.e., the one that is immediately behind the lead tote) into the aisle facing location. Optionally, the first drive mechanism of vehicle 200 is then operated briefly so that the vehicle 200 travels a vertical distance sufficient to uncouple the lead tote from the trailing tote(s). Once decoupling is completed, the second drive system may be actuated again to center the tote upon the vehicle 200.

The vehicle 200 may include a separate drive element for driving the transfer mechanism 210. Alternatively, the transfer mechanism may be interconnected with one of the horizontal or drive elements of the vehicle. Specifically, the transfer mechanism may be connected with one of the drive systems so that the drive system is selectively operable between driving the vehicle and driving the transfer mechanism.

For instance, the transfer mechanism may optionally be connected with one of the horizontal drive systems with a selectable connection so that in a first orientation the drive system drives the vehicle horizontally and in the second orientation the drive system drives the transfer mechanism. Referring to FIGS. 2C, 3B, and 4A to 4G, there is shown an embodiment of vehicle 200 which further includes an optional clutch mechanism 400 (FIGS. 4B and 4C) that can be engaged (FIG. 4C) and disengaged (FIG. 4B) to initiate and terminate transmission of power, respectively, from the motor(s) of the horizontal drive system to the transfer mechanism, whereby the second drive system may be operated independently of the transfer mechanism. In this instance, the clutch mechanism 400 may be configured as two clutch sub-assemblies which are symmetrically arranged relative to a longitudinal centerline of vehicle 200, with these sub-assemblies being indicated generally at 400a and 400b in FIGS. 2C and 3B. In FIGS. 4B and 4C, first clutch sub-assembly 400a is visible and includes a first pivotable carrier 410. Additionally, second clutch sub-assembly 400b is constructed substantially similarly to clutch sub-assembly 400a and, as such, includes a second pivotable carrier 412 (see FIG. 2C).

As best seen in FIG. 4B, first clutch assembly 400a includes a pivotable carrier, such as first pivotable carrier 410 that is pivotable between a first positioned and a second position. The clutch assembly may include a drive mechanism for actuating the clutch assembly between the first and second positions. Optionally, the carrier 410 may be biased toward the second position. For example, the pivotable carrier may be biased toward the second position and the biasing element may be configured so that the weight of the vehicle is sufficient to overcome the bias of the biasing element to pivot the carrier 410 to the first position. Specifically, the carrier 410 may be maintained in a first angular orientation relative to an underlying support surface S while the full weight of vehicle 200 is distributed among wheels 254a, 254b, 256a, 256b, 252a and 252b. FIG. 4C illustrates the vehicle in a raised position in which the weight of the vehicle is released so that the biasing element biases the clutch toward the second position. Specifically, as the vehicle 200 moves vertically in a direction away from underlying surface S, pivotable carrier 410, 412 are urged by a compressed coil spring 414 into the second angular position, which is reached when vehicle 200 has reached an elevation above surface S that is of at least dimension $g_1$ shown in FIG. 4C. Referring to FIG. 4B, it will be seen that a first transfer drive element 280 is rotatably coupled to the first pivotable carrier 412 and that a first endless loop element 284 transfers rotary power to the first drive element 280. The endless loop element may be any of a variety of power transfer elements, such as a chain or a belt. In this instance, the endless loop elements 284 is a belt.

Driven element 280 may be a pulley or a gear driven by the second motor of vehicle 200. Likewise, sub-assembly 400a may be driven by the third motor of vehicle 200. In this instance, the first transfer element 280 is dimensioned and arranged to engage the first endless loop element 280 to drive the first driven elements whenever the drive motor 250b is rotated. That is, regardless of whether clutch mechanism sub-assemblies 400a and 400b are engaged to drive the transfer mechanism, the first and second driven elements 270, 280 will rotate with the second and third motors 250a, 250b, respectively.

As noted previously, and in accordance with one or more embodiments consistent with the present disclosure, the second and third motors are coupled to engage the transfer mechanism when the vehicle has been elevated, relative to an underlying support surface S, by dimension H (FIG. 4C). Such elevation causes the pivotable carrier 410 to pivot out of the first angular orientation shown in FIG. 4B and into the second angular orientation shown in FIG. 4C. In the first position shown in FIG. 4B, transfer element 280 is spaced apart from drive element 282. Drive element 282 is connected with the transfer mechanism 210 to provide the driving power to drive transfer mechanism 210. In the first position in which transfer element 280 is spaced apart from drive element 282, the drive element for transfer mechanism 210 is disconnected from the drive motor 250. In the second position shown in FIG. 4C, the transfer gear 280 is pivoted into engagement with the drive element 282 so that the drive element for the transfer mechanism is connected with the drive motor.

Figure 4A:
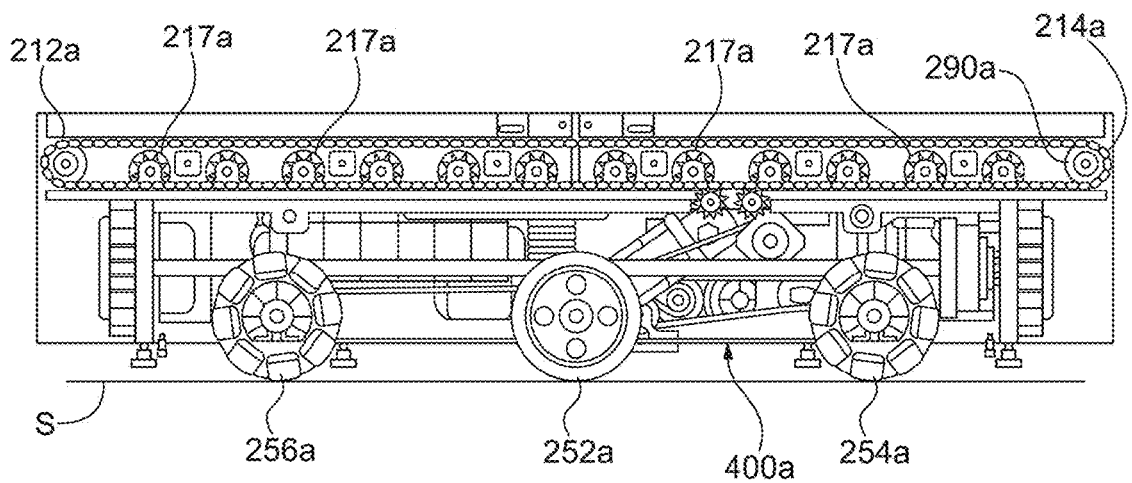
FIG. 4A is a sectional view of the vehicle of FIG. 2A, taken along line IVA-IVA.
Figure 4B:
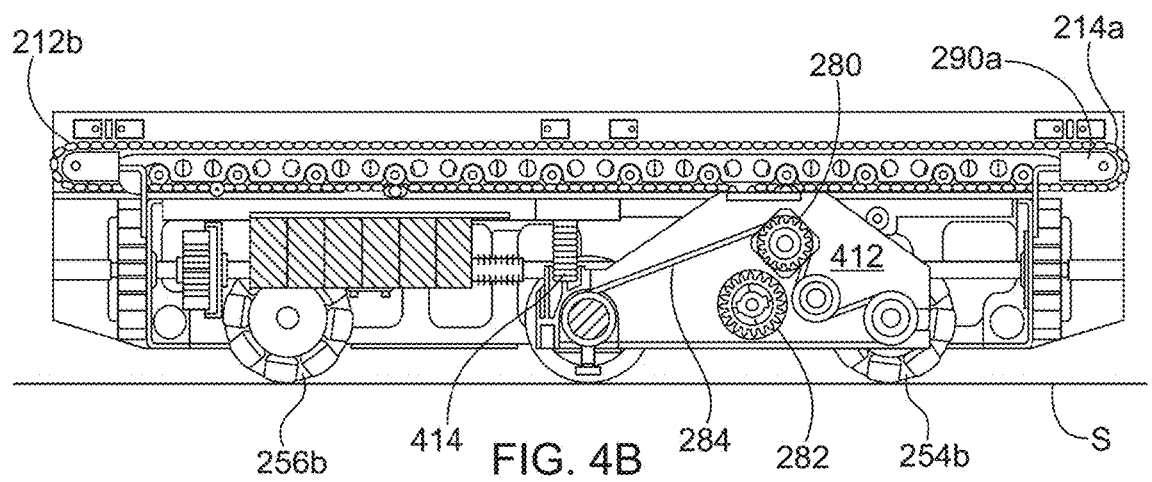
FIG. 4B is a sectional view of the vehicle of FIG. 2A, taken along line IVA-IVB in FIG. 2A illustrating a clutch mechanism in a disengaged position.
Figure 4C:
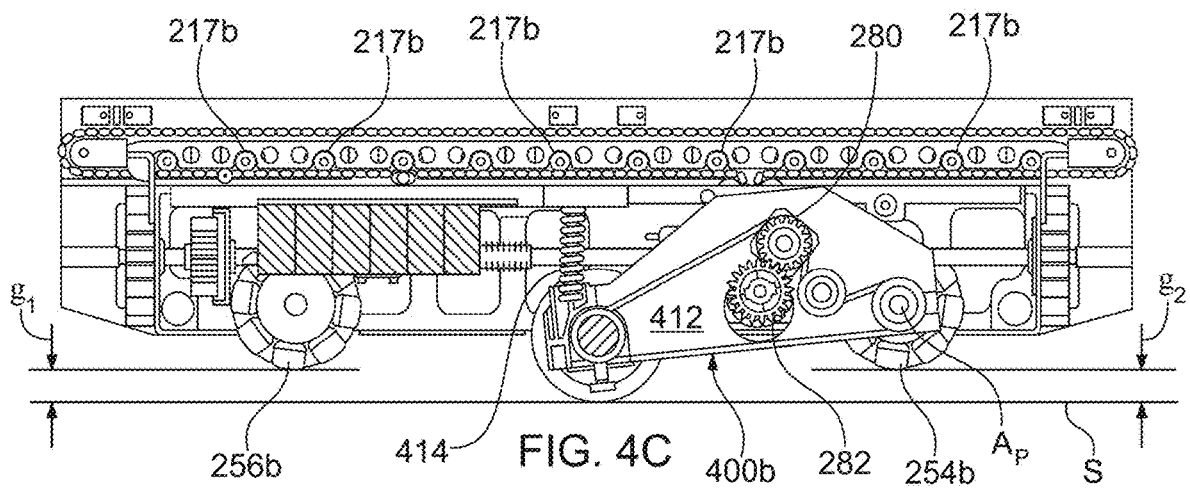
FIG. 4C is a sectional view of the vehicle of FIG. 4B, illustrating the clutch mechanism in an engaged position.

As shown in FIGS. 4A to 4C, when the clutch 400a,b pivots from a first position to a second position, the drive element for the transfer mechanism 210a,b is connected with the drive motor 250a,b, which causes rotation of first sprocket 290a, 290b which, in turn causes first and second chains 214a, 214b to move pin 212a (FIG. 4A) and pin 212b (FIG. 4B) toward or away from a container to be transferred to or from vehicle 200. When the wheels of vehicle 200 once again rest upon the surface S, as depicted in FIG. 4B, the drive elements 282 is again decoupled. As such, continued operation of the second and third motors of the vehicles as to propel vehicle 200 upon surface S, ceases to have any effect on the transfer mechanism 210.

Figure 4D:
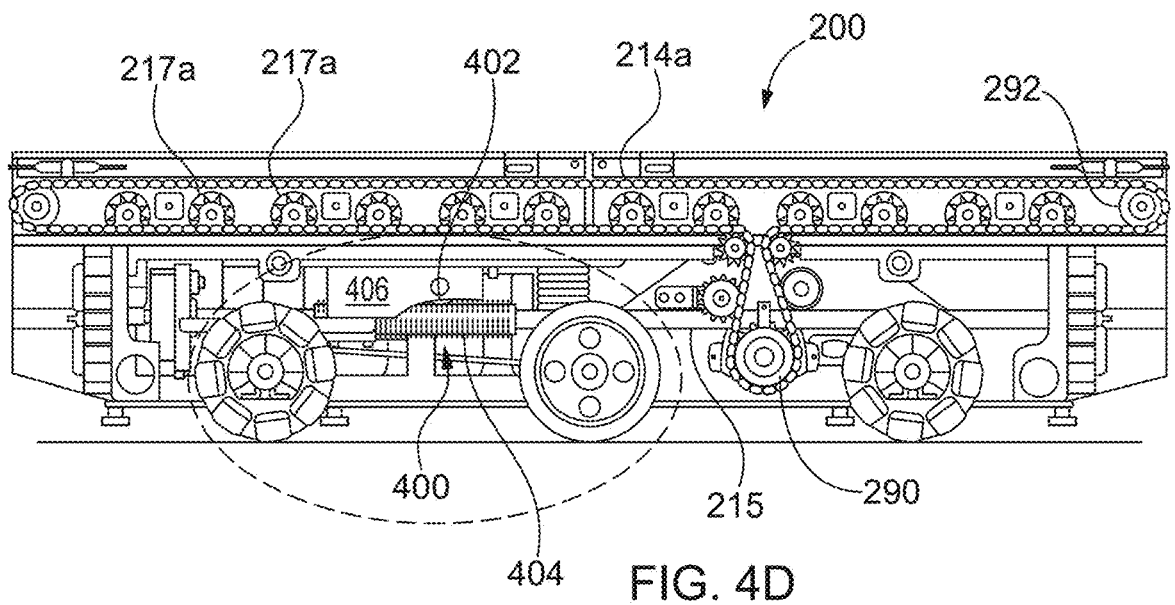
FIG. 4D is a partially broken away side elevation view of the vehicle of FIG. 2A, illustrating an actuator mechanism in a first position.
Figure 4E:
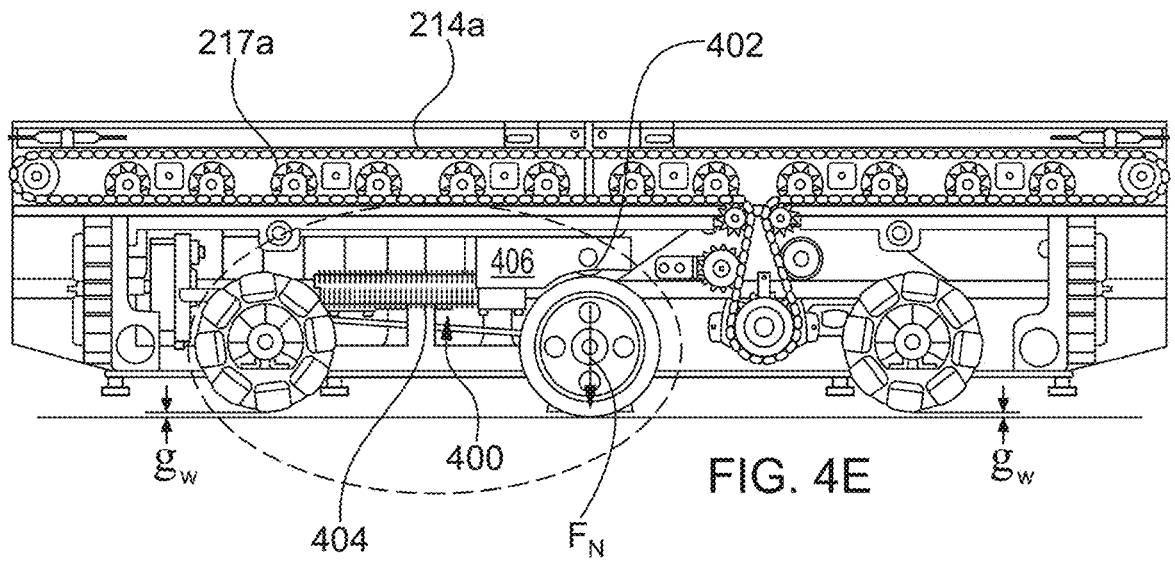
FIG. 4E is a side elevational view of the vehicle of FIG. 4D, illustrating the actuator mechanism in a second position.

In some applications, it may be desirable for vehicle 200 to be configured to load and unload items that differ from the totes described above. For example, it may be desirable to configure the vehicle so that it is operable to load and unload any of a variety of boxes, cartons, trays and the like, or any combination of these, and they may contain one or a plurality of items of inventory. In one or embodiments, such items are accommodated by a transfer mechanism 210 which incorporate an alternative or additional discharge assistant. With particular reference to FIGS. 2G and 4A to 4D, it will be seen that rotation of sprocket 290 causes chains 214a, 214b to drive sprockets 217, wherein each of the driven sprockets causes rotation of a corresponding one of the rollers, as rollers 211 (FIG. 2G). The direction in which the pairs of sprockets 217 are rotated determines whether the rollers of transfer mechanism 210 are operated to assist in loading or in unloading of an item, FIGS. 4D and 4E are side elevation views of the exemplary automated guided vehicle 200 of FIGS. 2A-2F, the lateral exterior cover plate being omitted to reveal an optional actuator mechanism 400 having a force imparting member 402 which is selectively movable between a first position (FIG. 4D) and a second position (FIG. 4E). FIG. 4F is an enlarged view of the actuator mechanism 400 depicted in FIGS. 4D and 4E, the force imparting member 402 being shown in the first, non-force imparting position. FIG. 4G is an enlarged view of the actuator mechanism depicted in FIGS. 4D to 4F, the force imparting 402 thereof being shown in the second, force imparting position.

As noted previously in the discussion of FIG. 4F, the wheels 220 are mounted onto two parallel spaced apart axles, as axle 215 depicted in FIG. 2F, so that two of the wheels are disposed along the forward edge of the vehicle and two of the wheels are disposed along the rearward edge of the vehicle. In one or more embodiments, the optional actuator mechanism 400 includes a threaded portion 404 of each axle 215 and a respective pair of carriers 406. Each respective carrier 406 has a correspondingly threaded bore dimensioned and arranged to receive the threaded portion 404 of an axle 215 and carries one of a pair of force imparting members 402. In one or more embodiments, the force imparting members are rollers which are freely rotatable within carriers 406 about axes of rotation which are transverse to the axes defined by axles 215.

Force imparting members 402 may be selectively actuatable without the need for a dedicated motor to drive the force imparting member. Optionally, rotation of motor 230 (FIG. 3B) causes axles 215 to rotate, which drives carriers 406 forwardly until they encounter a stop whereupon continuation of the axles 215 produces no further movement of the carriers 406. When positioned as shown in FIG. 4G, each force imparting members exerts a normal force upon a surface of one of the wheels as, for example, while the wheels 252a, 252b are being driven by the second and third motors, respectively. Such actuation of the force imparting members 402 increases frictional contact of wheels 252a and 252b and thereby provides better directional control as the vehicle 200 is moved across underlying surface S (FIG. 4G). As the wheels 252a, 252b are only required while the vehicle is external to the array of storage area 215, motor 230 and axles 215 are able to serve a dual purpose.

Thus, with continuing reference to FIGS. 3B and 4D to 4G, it will be seen that in some embodiments, vehicle 200 includes a first pair of motor driven omnidirectional rollers and a second pair of motor driven omnidirectional rollers, wherein a first omnidirectional roller of each pair is dimensioned and arranged to rotate about a first axis of rotation, wherein a second omnidirectional roller of each pair is driven for rotation about a second axis of rotation, a fifth roller driven by one of the first motor and the second motor; and an actuator movable from a first position to a second position to selectively urge the fifth roller in a direction toward an underlying support surface; wherein a surface of each of the first and second pairs of omnidirectional rollers, and a surface of the fifth roller are dimensioned and arranged to contact the underlying support surface while the actuator is maintained in the first position, and wherein movement of the actuator into the second position causes a transfer of load from one or more of the omnidirectional rollers to the fifth roller.

In one or more embodiments, the vehicle 200 may be powered by an external power supply 95, such as a contact along a continuous charging rail or, alternatively, using an inductive power transfer coil, either of which serving to provide the electric power needed to drive the vehicle. However, in the present instance, the vehicle 200 includes an onboard power source that provides the requisite power for both the first drive motor 230 and the motors that drive the second drive system. The onboard power supply may be rechargeable. In that regard, the power supply may include a power source, such as a rechargeable battery, a bank of ultra-capacitors, as capacitors 240 (FIG. 3B) or a combination of these. For example, ultra-capacitors can accept very high amperage in a recharging operation. By using a high current, the ultra-capacitors can be recharged in a relatively very short period of time, measurable in seconds or minutes as compared to the hours which may be required to charge a suitable battery. On the other hand, provisions can be made, according to one or more embodiments, to automate the process of replacing a discharged battery, with a recharged one, as part of the process of operating one or more of the vehicles.

Where a charging rail is used, each vehicle 200 may include one or more contacts for recharging the power source. In the present instance, the vehicle may include a plurality of brushes, such as copper brushes that are spring-loaded so that the brushes are biased outwardly. The brushes cooperate with a charging rail to recharge the power source, as described further below. For instance, a pair of charging rails may be disposed along the columns within which the vehicles 200 move during a sequence of one or more storage and/or retrieval tasks. Alternatively, vertical and/or horizontal charging rails may be arranged within charging stations disposed in the vicinity of the workstation 500 (FIG. 7).

Optionally, the charging rails are conductive strips connected with an electrical supply. The charging contacts of the vehicle 200 engage the conductive strips to recharge the ultra-capacitors. Specifically, the biasing element of the brushes biases the brushes outwardly toward the charging contacts. The electricity flowing through the charging contact provides a high amperage, low voltage source that allows the ultra-capacitors to recharge in an interval measurable in seconds or minutes, depending upon the amount of power consumed during a sequence of inventory management tasks or subtasks.

Vehicles utilizing ultra-capacitors as a power source may recharge charges each time the vehicles travel within a loading column and/or utilize a charging station disposed along a path taken in the course of performing an inventory management tasks.

Optionally, each vehicle may include one or more load sensors for detecting that an item is loaded onto the vehicle. The sensor(s) ensure that the item is properly positioned on the vehicle. For instance, the load sensor may include a force detector detecting a weight change or an infrared sensor detecting the position of an item on the vehicle.

The vehicle 200 may be semi-autonomous or, alternatively, fully autonomous. In the latter regard, a multitude of non-contact systems have been proposed for the purpose of continuously determining the actual position of an automated guided vehicle in absolute coordinates, and resetting navigational parameters (i.e., X, Y, and heading) to null out accumulated errors, thereby re-referencing the vehicle. Any of these may be utilized in the implementation of position referencing for automated guided vehicles in an inventory management system consistent with embodiments of the present disclosure. Such referencing systems can be ultrasonic, RF, or optical in nature, with ultrasonic and optical being especially suited to indoor scenarios. Of these latter two categories, optical systems are generally more accurate and therefore more widely employed in commercial practice.

Exemplary position sensing systems utilize a scanning mechanism that operates in conjunction with fixed-location references strategically placed at pre-defined surveyed sites. Such scanning mechanisms may include scanning detectors with fixed active-beacon emitters, scanning emitter/detectors with passive retroreflective targets, scanning emitter/detectors with active transponder targets, and rotating emitters with fixed detector targets.

In one or more illustrative embodiments consistent with the present disclosure, the vehicles may optionally rely on a scanning laser triangulation scheme (SLTS) to provide positional updates to an onboard dead-reckoning system of the vehicle. A laser emitter rotating at, for example, two rpm illuminates passive retroreflective barcode targets affixed to walls or support columns at known locations on the order of fifteen meters away from the vehicle. The barcodes are used to positively identify the reference target and eliminate ambiguities due to false returns from other specular surfaces within the operating area. An onboard computer of each vehicle calculates X-Y positional updates through simple triangulation to null out accumulated dead-reckoning errors.

Alternatively, each vehicle 200 may optionally utilize retroreflective targets, distributed throughout the operating area, in a manner which allows both range and angular orientation to be determined by each vehicle. For example, a servo-controlled rotating mirror on the vehicle may optionally pans a near-infrared laser beam through a horizontal arc of 90 degrees at, for example, a 20-Hz update rate. When the beam sweeps across a target of known dimensions, a return signal of finite duration is sensed by the detector. Where the retroreflective targets are all the same size, the signal generated by a close target will be of longer duration than that from a distant one. Angle measurement is initiated when the scanner begins its sweep from right to left, where detection of the reflected signal terminates the timing sequence.

As yet another position reference technique which may be employed in the vehicle is a laser-based scanning beacon system computes vehicle position and heading using cooperative electronic transponders with passive reflectors. Such a scanner mechanism includes a rotating mirror attached at, for example, a 45-degree angle to the vertical shaft of an incremental optical encoder. To improve azimuthal accuracy, optionally a timer interpolates between encoder counts. The fan-shaped beam diverges vertically at, for example, a four-degree spread angle, to ensure target detection at long range while traversing irregular floor surfaces. Each target is uniquely coded, and many (e.g., 32) targets can be processed in a single Scan, with vehicle X-Y position calculated every 100 milliseconds.

In one or more embodiment, each vehicle may maintain, in memory, an internally stored map of its own position within a facility. In addition, each vehicle provides signals to the central controller that may include data such as position, speed, angular orientation in the plane of travel, and a selected path of travel data to other vehicles in the facility. The vehicle may also include a receiver so that the vehicle can receive such data regarding other vehicles. The vehicle may receive such data regarding other vehicle either directly from other vehicles or from a central controller. Using the vehicle data, each vehicle may maintain a dynamically updated map which reflects the position of all vehicles in the particular zone(s) of an inventory management facility to which that vehicle has been assigned. When dynamically updated position data is available locally at each vehicle, a task may be assigned to a vehicle by a central controller 450, including the path segments taken by a vehicle to reach the location(s) where elements of the assigned task are to be performed may be selected by the vehicle.

Each vehicle may include a processor configured to execute steps of a navigation process stored in memory which cause the vehicle to follow a shortest path from a current location of the vehicle to a destination where the next subtask(s) of an assigned task are to be performed. In such embodiments, the central controller 450 need not be configured to execute traffic control and collision avoidance functions (unless a backup control scheme is desired) but, instead, the central controller 450 may be configured to transmit signals representative of instructions which identify the next task(s) to be assigned to each vehicle and which specify the various locations within the facility where those tasks are to be performed. The vehicles, on the other hand, may be configured to transmit signals to the controller which are representative of task assignment acknowledgements, position updates, status updates (e.g., sub-task completed or in process, current power status, etc.), and other information which the controller may require to assess the relative ability of the vehicles to perform tasks awaiting assignment.

In a fully autonomous scheme according to one or more embodiments, each vehicle may alternatively utilize a local processor to determine speed and direction of movement from sensed indicia placed on an underlying support surface in one or more zones of an inventory management facility, to exchange that positional data with other vehicles within the facility, and to maintain a dynamically updated, local map to achieve a form of decentralized traffic control in manner similar to that described above using other positional sensing approaches.

In semi-autonomous configurations of vehicles 200, also referred to as automatic guided vehicles (AGVs), a central controller, such as controller 450, provides traffic control functions needed, for example, to prevent collisions of the vehicles with one another and/or with any potential obstructions to vehicle movement which may be present in the one or more zone(s) of a facility to which a subset of vehicles are assigned. In such embodiments, the controller 450 receives current position and bearing data in the form of update signals transmitted from the vehicles 200. The received position and bearing data are compared with estimates that the controller has derived from prior speed and heading instructions transmitted by the controller to the vehicle. Based on the comparison, the controller 450 may determine that corrections to one or more of the velocity and the direction of one or more vehicles that is needed to prevent a collision and, if so, transmit those instructions to the vehicle(s).

In one or more semi-autonomous embodiments, each vehicle 200 may include a reader for reading indicia placed on a surface upon which the vehicle is traveling and/or in positions within access columns aligned with the array of storage areas 115 (FIG. 1C). In some embodiments, each indicium of a first group of indicia corresponds to a unique location to form a grid of locations. These locations may be stored in a data table in a memory accessible to a processor of the vehicle, of the central controller 450, or a both. By following a path designed to intersect with a particular sequence of these indicia, each vehicle may transmit an identifier of an indicium as it passes over it and confirm it to controller 450 whereupon a semi-autonomous guiding of the vehicle is achieved via instructions transmitted by the controller to the vehicle. From this information and other data reported by each vehicle, controller 450 can confirm the speed, direction, and path of movement for each vehicle. In one or more embodiments, controller 450 utilizes speed and directional data to enforce collision avoidance policies, to assign inventory management tasks according to the location and power reserve status of each vehicle and, in the interest of safety, to maintain an appropriate distance from any personnel permitted in the area.

Additional indicia may be affixed, within the access columns or to stored totes themselves, at positions adjacent to each storage locations. Here, each indicium may bear include a unique bar code, and the reader on each vehicle 200 may scan the area around the storage location at which an item is to be delivered or retrieved. The data that the central processor 450 has regarding the path that a vehicle 200 has to follow and the data regarding the distance the vehicle has traveled based on the data regarding the rotation of the drive motor may be sufficient to determine whether the vehicle 200 is positioned at the appropriate storage location within the storage areas. Nonetheless, indicia adjacent the storage areas permits a redundancy check of the location of the vehicle before an item is discharged into or received from the appropriate storage location. Therefore, the scanner may operate to scan and read information regarding the storage location at which the vehicle is stopped. If the scanned data indicates that the storage location is the appropriate storage location, then the vehicle discharges its item into the storage location. Similarly, the vehicle may have a second reader for reading indicia adjacent the rearward edge of the vehicle. The second reader may be used in applications in which the system is set up to utilize a first series of storage locations along the forward side of an access column and a second series of storage locations along the rearward side of an access column, as shown in FIG. 1.

In some embodiments, functionality for autonomous or semi-autonomous guidance of the vehicles 200 may be integrated into one or more functional accessory. Such an approach may be beneficial where precise position sensing is required in some zones within an inventory management facility, but a less precise position sensing approach may be acceptable in other zones. For example, in embodiments such as that depicted in FIG. 1, functional accessories 700 are depicted as serving a supporting role to maintain a necessary supply of items to operators at a workstation.

In the foregoing description, the vehicles have a vertical drive 220 that is dimensioned and arranged to interact with tracks disposed adjacent storage areas 820 of racks 800 as discussed further below. The drive gears effect the raising or lowering of a vehicle, depending upon the direct of rotation of motor 230. As well, the functional accessories may incorporate tracks that cooperate with the vertical drive so as to permit a vehicle to raise and lower a functional accessory with which it is associated.

In some embodiments, the processor of each vehicle controls the operation of the vehicle in response to signals received from the central processor 450. Additionally, the vehicle includes a wireless transceiver so that the vehicle can continuously communicate with the central processor as it travels along the track. Alternatively, in some applications, it may be desirable to incorporate a plurality of sensors or indicators along paths which the vehicles may traverse. The vehicle may include a reader for sensing the sensor signals and/or the indicators, as well as a central processor for controlling the operation of the vehicle in response to the sensors or indicators.

As shown in FIG. 1, a material handling system 10 may include a number of different stations or areas. For instance, the system 10 may include a large number of storage locations arranged in numerous racks 800. The racks may accommodate thousands or tens of thousands of storage locations. Additionally, the system may optionally include smaller racks referred to as flow racks 600, which are designed to accommodate higher volume fast moving items. These flow racks 600 may positioned near workstations WS so that operators at the workstation may readily access the items. The vehicles may be adapted to operate in of different aspects of the system, including but not limited to the flow racks 60 and the storage racks 800.

Moveable Track

At a location proximate a workstation, one or more flow rack structures 600 can supply the workstation operator(s) with items of inventory which are required or expected to be required based on a demand forecast, to fulfill inventory management requests in an upcoming inventory management interval (e.g., to satisfy e-commerce or mail orders during one or more upcoming picking cycles).

Referring to FIGS. 1 and 6A-6F The vehicles 200 may optionally be operable to supply items to a variety of flow rack structures 600. The flow rack 600 may include a plurality of storage locations for receiving a plurality of items, such as totes 55 or other containers. The storage locations may be arranged in a plurality of columns 605. Each column optionally includes a plurality of vertical rails 610 that support a plurality of horizontal support elements that support the totes 55. For instance, the vertical rails may support a plurality of generally horizontal shelves 612 vertically spaced apart from one another. The spacing between the shelves may vary to provide storage locations having different heights within the same column.

The storage locations may be generally horizontal locations. Alternatively, the storage locations may be angled relative to the horizon so that items in the storage locations 612 tend to move toward the front edge of the storage location as shown in FIG. 6B. An element such as a vertical lip or a flange may form a stop impeding the item from sliding off the front edge of the storage location.

The backside 615 of the flow rack is generally open so that the vertical rails frame an opening into each storage location (i.e. tier or shelf 612). The opening provides access for transferring a supply of items between the flow rack 600 and a delivery system. For instance, totes may be delivered to the flow rack 600 and an operator may lift the totes onto the shelves through the backside of the flow rack.

The storage locations 612 may be large enough to accommodate a plurality of tote. Specifically, each storage location may have a length that is greater than the length of a plurality of totes so that a number of totes can be fed into the storage location to form an aligned series of totes. As the operator empties the tote closest to the front of the storage location, the tote is removed and the tote behind the empty tote slides forward or is conveyed forward to the font of the storage location.

In some applications, it may be desirable to deliver the totes directly to the flow racks using the vehicles 200. Accordingly, the system may include an option track that the vehicles can climb to raise the vehicle into alignment with the appropriate storage location so that the vehicle can transfer the tote to the storage location 612 in the flow rack 600.

Referring to FIGS. 5A-5F an optional structure configured to cooperate with the vehicles 200 to raise the vehicles is designated generally 700. The structure may be a lift such as an elevator that includes a powered element for lifting the vehicle. Alternatively, the structure may include a guide or track configured to cooperate with the vehicle to raise the vehicle without an externally powered mechanism. For instance, the structure 600 may include a track 620 configured to cooperate with the vertical drive 220 of the vehicle. The vehicles may drive up the track 620 to lift the totes 55 to the desired storage location 612 in the flow rack.

Optionally, the structure 700 is moveable so that the structure can be moved to different columns 1105 in the flow rack. Additionally, optionally, the structure 700 in configured to cooperate with the vehicle so the vehicle can move the structure 700 to the desired location. Further still, optionally, the structure 700 is configured to cooperate with the vehicle 100 so that the vehicle can lift the structure vertically and convey the structure horizontally along a path toward a storage location, such as along a path toward one of the columns of the flow rack. In this way, the structure 700 optionally includes a track 720 that the vehicle can climb. The vehicle may also be optionally configured to move the track vertically or horizontally to a desired location and then climb the track.

Referring to FIGS. 5A-5B, an optional structure providing a moveable track 700 is illustrated. The moveable track includes a support structure forming a vertical column. The column includes a plurality of spaced apart vertical posts 710a,b,c,d. The posts are generally parallel to one another and spaced apart to form a column having a length and width corresponding to the length and width of the vehicle. In particular, the vertical posts are spaced apart so that post 710a and 710b form an opening at least as wide as the width of the vehicle. Post 710c is parallel to post 710a and spaced apart from post 710a a distance at least as long as the approximate length of the vehicle. Post 710d is parallel to post 710b and 710c and together with post 710c forms an opening that forms a discharge opening for transferring items between the vehicle and a storage location. The moveable column 700 may include a plurality of horizontal rails 712 interconnecting the posts 710a-d and or cross brackets connecting the posts to form a free-standing structure.

The moveable column 700 may also include a structure that cooperates with the vertical drive 220 of the vehicle so that the vehicle can climb upwardly. For instance, the moveable column may include one or more track elements configured to cooperate with the vehicle to allow the vehicle to climb upwardly. Optionally, the track elements may include a plurality of teeth vertically spaced apart along the track. The track may have teeth spaced at a uniform pitch to cooperate with the climbing gears 220 of the vehicle. Although the track 720 is described as having a plurality of teeth, it should be understood that the track can be any of a variety of structures configured to permit the vehicle to climb upwardly. Accordingly, the term track may mean any guide configured to cooperate with the track to facilitate the vertical displacement of the vehicle.

The track 720 may be connected with the structure 700 in a variety of orientations depending upon the configuration of the vertical drive of the vehicle. In the present instance, the track is oriented to cooperate with the vertical drive gears 220 of the vehicle. Optionally, the track is connected with the structure 700 to cooperate with the vehicle so that the vehicle can climb vertically while maintaining the orientation of the vehicle relative to the horizon. In other words, the track may be connected with the structure so that the vehicle can climb the track without tilting relative to the horizon.

For instance, a first track element 720a may be mounted on the inside of post 710a and a second track element 720b may be mounted on the inside of post 710b. The two tracks 720a,b may be spaced apart a distance corresponding to the distance between the drive gears 220 of the vehicle. Similarly, a third and fourth track may be mounted on the inside of posts 710c and 710d and spaced apart a distance corresponding to the distance between the drive gears. Accordingly, the vertical drive gears 220 of the vehicle may be driven synchronously so that the vehicle may climb the tracks while maintaining the horizontal orientation to keep the vehicle from tipping relative to the horizon.

Figure 5C:
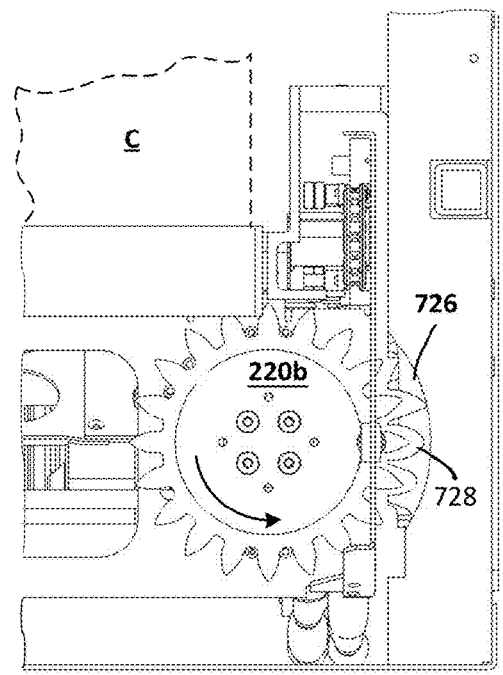
FIG. 5C is an enlarged fragmentary view of a portion of the moveable rack illustrated in FIG. 5A, partially broken away.
Figure 5D:
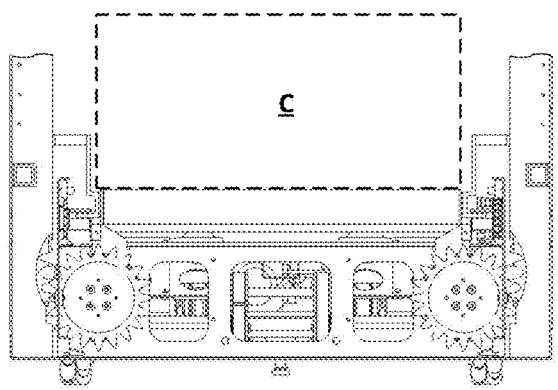
FIG. 5D is an enlarged fragmentary view of a portion of the moveable rack illustrated in FIG. 5A, showing the rack in a raised position.
Figure 5E:
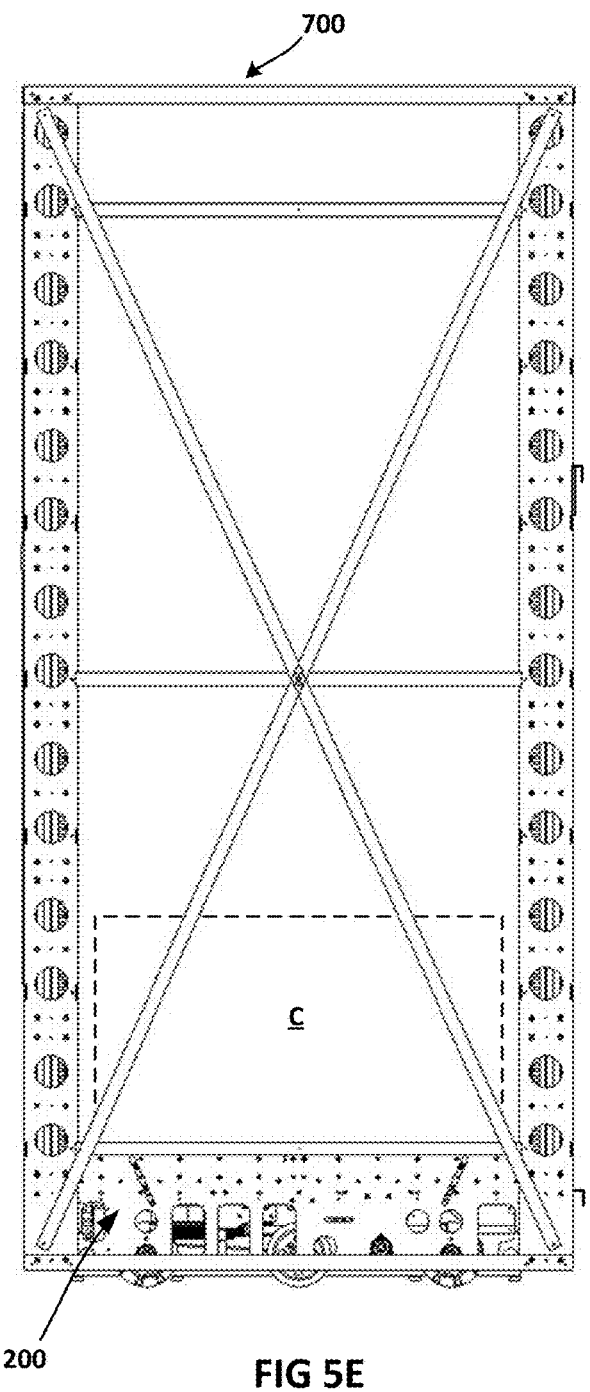
FIG. 5E is a side elevational view of the moveable rack illustrated in FIG. 5B, illustrating the moveable rack in a raised position.
Figure 5F:
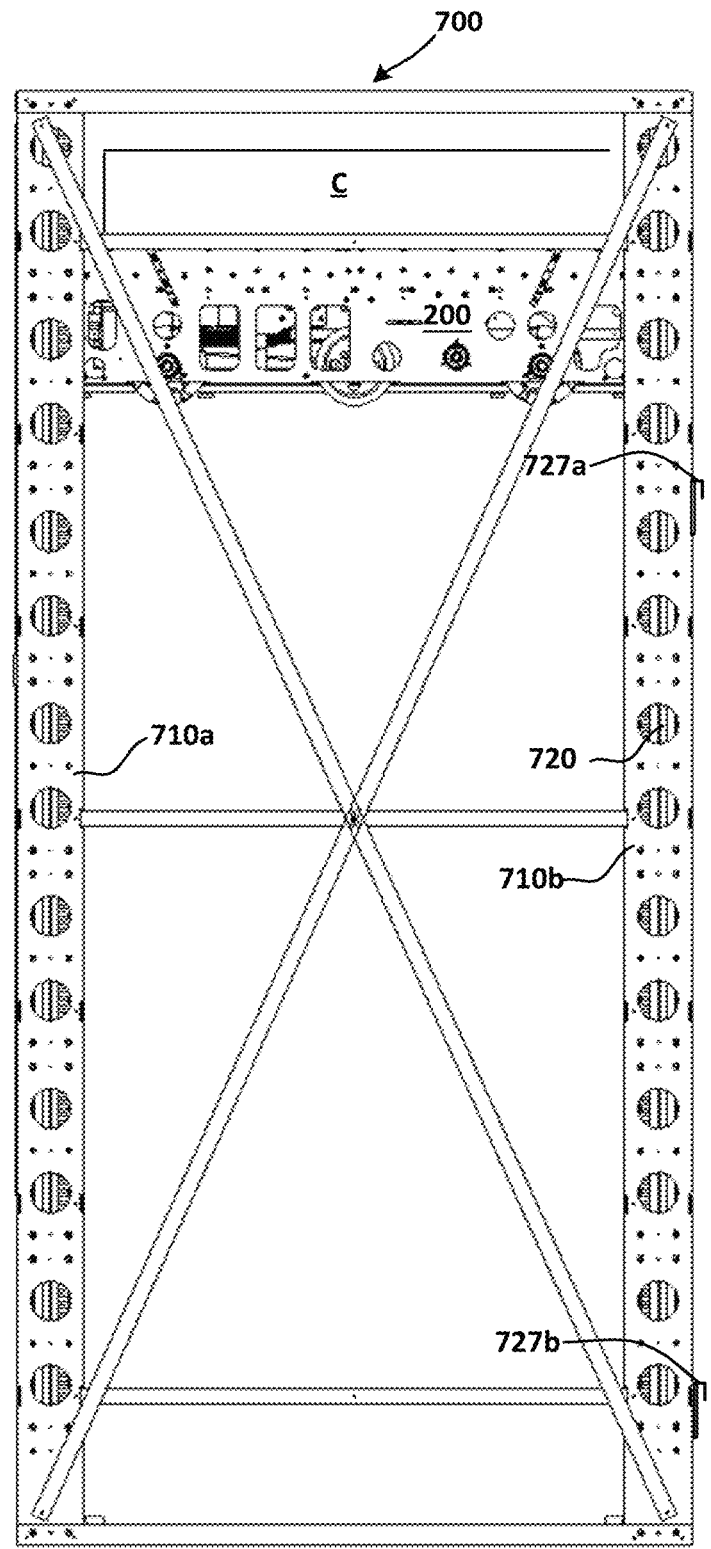
FIG. 5F is a front elevational view of the moveable rack illustrated in FIG. 5B, illustrating the moveable rack with a vehicle in a raised position.

Referring to FIGS. 5A-5C, the moveable track 700 is shown with the vehicle 100 in a lowered position so that the vehicle is on a horizontal surface, such as the floor. The moveable track may be resting on the same horizontal surface as the vehicle. In FIGS. 5D-5E the moveable track is shown in a raised position in which the vehicle has lifted the track. Specifically, when the vehicle 200 is positioned within the column, activating the vertical drive 220 in a first direction causes the vertical drive 220 to drive the track upwardly, thereby lifting the moveable track 700. Once the vehicle raises the moveable track, the horizontal drive 252, 254, 256 are operable to displace the vehicle horizontally to move the moveable track horizontally.

Additionally, when the vehicle 200 is positioned within the column, driving the vertical drive 220 in a second direction causes the vehicle to lower the moveable track if the track is raised. Alternatively, if the moveable track is supported on the floor or similar horizontal surface, driving the vertical drive 220 in a second direction causes the vehicle to drive upward along the track. Similarly, if the vehicle is in the track above the ground, driving the vertical drive in the first direction causes the vehicle to drive vertically downwardly until the vehicle reaches the ground.

The vertical drive 220 of the vehicle may be configured so that the vertical drive gears 220 are displaceable inwardly to reduce the distance between the vertical drive gears. In this way, the drive gears can be moved inwardly to provide clearance between the tracks 720 and the vertical drive gears as the vehicle drives into the column. Alternatively, as described above, the vertical drive gears may be mounted on shafts so that the axis of rotation of each vertical gear is substantially parallel to the horizontal direction of travel. Additionally, the axes of rotation of the vertical drive gears may be substantially fixed so that the lateral distance between each pair of vertical drive gears is substantially fixed. Therefore, in order to enter the column, the teeth of the vertical drive teeth are aligned with the teeth in the track 720 so that the teeth of the vertical drive gears pass through the teeth in the track.

Referring to FIG. 5C, the track 720 and the vertical drive gear 220 may be aligned so that the vertical drive gears do not impinge upon or contact the track when the vertical gear is translated relative to the track. For instance, the spacing between the teeth of track 720 provides sufficient clearance for the teeth of the vertical drive gear 220 to pass between the gaps between the teeth of track 720 when the vertical drive gear translates horizontally along a line that is parallel to the axis of rotation of the vertical drive gear 220. More specifically, the vertical drive gear and the track may be configured and positioned so that the addendum circle of the vertical drive gear 220 overlaps with the addendum line of the teeth in the track. While the addendum circle of the drive gear overlaps the addendum line of the track, the teeth of the gear are configured and oriented so that the vertical drive gear passes through the gaps between teeth in the track 720.

Referring again to FIG. 5C, optionally, the vertical drive gear 220 and the track 720 may be configured and oriented to increase the clearance for the vertical drive gear to pass through the track when the vehicle drives into the moveable track 700 (i.e. when the vertical drive gear translates so that the axis of rotation of the vertical drive gear translates horizontally into the moveable track). For instance, the track 720 may have an upper portion and a lower portion 725. The upper portion may have a tooth pitch and configuration to mate with the teeth of the vertical drive gear 220. The lower portion 725 may have a tooth pitch that is substantially similar to the tooth pitch of the upper section, but the tooth profile of the lower section may be substantially different than the upper section. For instance, the teeth of the lower section may be substantially narrower than the teeth of the upper section. For instance, the teeth may be at least 10% narrower and preferably at least 20% narrower. Optionally or additionally, the teeth of the lower section 725 may have dedendum that is substantially greater than the dedendum of the upper section. For instance, the dedendum of the lower section may be greater than the upper section so that the root of the teeth extends inwardly away from the drive gears a greater distance than the root of the teeth of the upper section. For instance, the dedendum of the teeth of the lower section may be 10% greater and preferably is 20% greater.

Additionally, the lower section may optionally have a tapered pitch line so that the clearance between adjacent teeth gradually diminishes as the teeth progress up the height of the lower section. In other words, the clearance 728 between adjacent teeth at the bottom of the lower section is greatest and the spacing between adjacent teeth at the upper part of the lower section is at a minimum and the clearance gradually decreases from the maximum to the minimum.

Configured as described above, the vertical drive 220 may optionally be configured to pass through openings in the track so that the vertical drive is aligned with the track. After the vertical drive is aligned with the track, the vertical drive is positioned to cooperate with the track to raise the track and/or to climb the track as described further above.

The moveable column 700 may be used in conjunction with other elements of the system 10. For instance, as mentioned above, the system may optionally include racks of storage locations, such as flow racks 600. It may be desirable to connect the moveable track with another portion of the system, such as the optional flow rack 600. Accordingly, it may be desirable to provide a connector on the moveable track 700 that is configured to releasably engage the flow rack 600 or other elements to which the track is to be releasably connected.

As shown in FIG. 6B, the moveable track 700 may incorporate connector 727 that releasably connects the moveable track with the flow rack 600. Optionally, the flow rack may include a mating connector, such as connector 627 that matingly engages the connector 727 on the moveable rack. The connectors 727, 627 may be any of a variety of mechanical connectors. In the present instance, the connectors 727, 627 are configured so that relative vertical displacement of the column relative to the flow rack connects the two connectors. Optionally, relative vertical displacement of the column relative to the flow rack in the reverse direction releases the two connectors. Additionally, the moveable track 700 may include a series of connectors 727a, 727b that cooperate with a plurality of connectors 627a, 627b attached to the flow rack 600. In this way, one or more connectors optionally interconnect the moveable track 700 with the flow rack to impede lateral displacement of the moveable track relative to another item of the system, such as the flow rack 600.

Configured as discussed above, the system may optionally include a moveable track 700 that cooperates with a portion of the system, such as a flow rack to enable the vehicle to deliver an item to a raised storage location. Specifically, the vehicle 200 may be controlled by a controller, such as a central controller to guide the vehicle into alignment with an opening configured to receive the vehicle. Optionally, the moveable track comprises a moveable column and the vehicle is aligned with an opening into the interior of the column. The vehicle may then drive through the opening and into the column. The vehicle 200 may be driven into alignment with a track 720 in the column so that a drive mechanism of the vehicle engages the track. For instance, optionally, the vehicle includes a vertical drive mechanism 220 that cooperates with the track 720.

Once vertical drive 220 is aligned with the track 720, the system may control the vertical drive to drive the vertical drive in a first direction that operates to raise or lift the moveable track 700 above the surface that supports the vehicle. Once the track is lifted, the vehicle 200 may be driven in a horizontal direction to move the moveable track to an alternate location. Optionally, a horizontal drive system 252 of the vehicle is controlled to drive the vehicle. For instance, the vehicle may be driven toward a structure such as a flow rack so that an opening of the moveable column is aligned with an opening of the flow rack. Additionally, the vehicle may be displaced horizontally so that connectors 727 of the moveable column are aligned with connectors 627 connected to the flow rack 600. Once the connectors are aligned, driving the vertical drive of the vehicle in a second direction operates to lower the moveable rack vertically downwardly. Optionally, driving the vertical drive in a second direction lowers the connector(s) 727 of moveable track into engagement with the connectors of the flow rack to releasably connect the moveable track with the flow rack.

In addition to moving the moveable rack 700, optionally the vehicle 200 is configured to climb the rack. For instance, the moveable rack may include a track 720 that extends vertically upwardly and once the rack is positioned on the ground adjacent the flow rack, driving the vertical drive 220 in the second direction operates to drive the vehicle vertically up the track 720. As shown in FIG. 6D, the vehicle may drive vertically upwardly until the vehicle is aligned with an opening in the column and an opening in the back of the flow rack and a storage location 612, such as a shelf, of the flow rack. Once aligned with the shelf, the vehicle may transfer an item, such as a tote onto the storage location of the flow rack. Alternatively, the vehicle may transfer an item from the storage location onto the vehicle. In this way, the vehicle is operable to move a moveable rack, climb the rack and transfer an item between the vehicle and a storage location.

As described above, the vehicle is operable to move a moveable track 700 and connect the track with a storage mechanism, such as a flow rack. After connecting the moveable track to the flow rack, the vehicle may drive out of the column leaving the moveable rack in alignment with and connected to the flow rack. After the vehicle exits the moveable column a second vehicle may enter the column while the column remains connected with the flow rack. The second vehicle may then climb the track 720 to deliver an item to one of the storage locations and/or to remove an item from a storage location. For example, the second vehicle may drive upwardly into alignment with storage location 612b and actuate a transfer mechanism 210 to transfer an item through an opening in the column and into the storage location. The vehicle may then move vertically along the track to align the vehicle with storage location 612a and actuate a transfer mechanism to transfer an item from storage location 612a onto the vehicle. The vehicle may then drive downwardly and then out of the column to deliver the item to another area, such as to another storage location or to an operator.

Figure 6A:
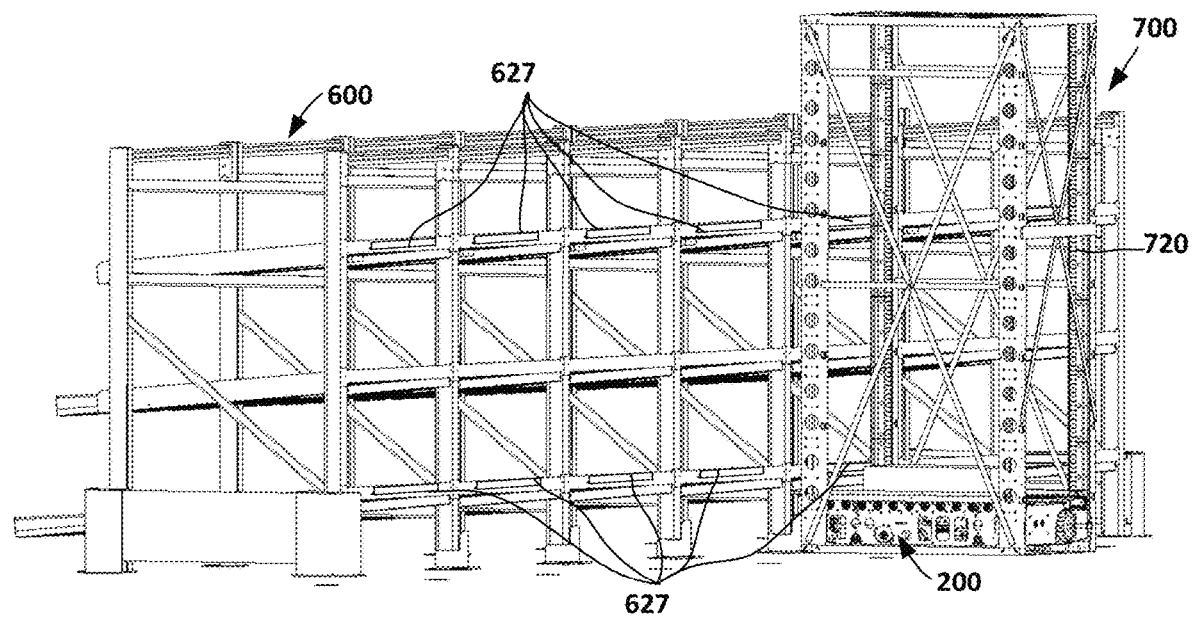
FIG. 6A is an enlarged perspective view of a moveable rack and a flow rack of the material handling system illustrated in FIG. 1*d*.
Figure 6B:
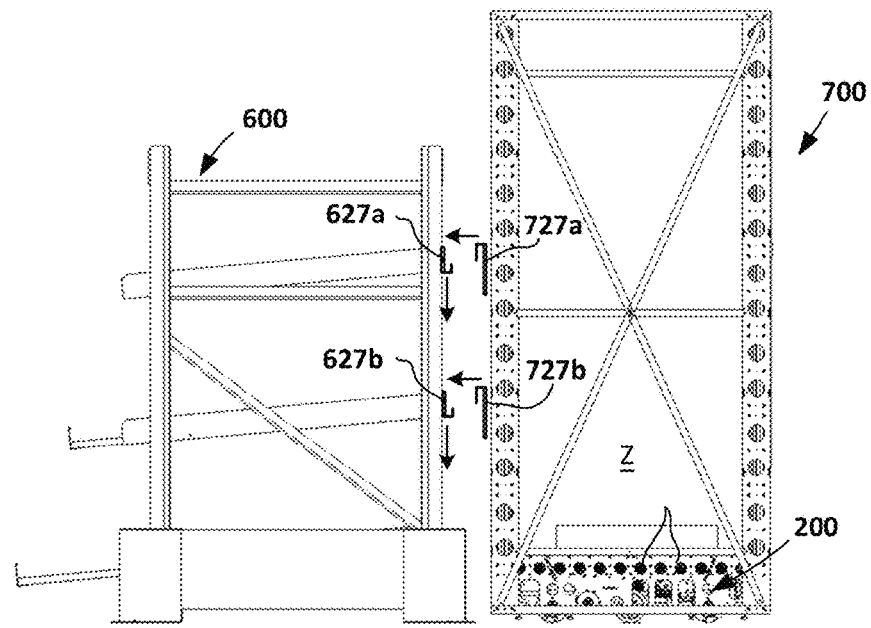
FIG. 6B is a side elevational view of the moveable rack and flow rack illustrated in FIG. 6A.

As shown in FIG. 6A, the vehicle 200 may be controlled to selectively align the moveable column 700 with one of a plurality of columns in a separate storage system. For instance, the storage system, such as flow rack 600 may include a plurality of columns. The system may identify which of the columns the moveable column is to cooperate, and the controller may then direct the vehicle to drive the rack to the identified column.

Some flow rack structures may feed articles to a workstation using unpowered rollers for single direction feeding assisted solely by the force of gravity. Alternatively, and as shown in FIG. 6D, rack structure 600 may utilize a bidirectional network of parallel belts 628 or other conveying element in order advance items toward or away from the pick station. Driving one or more of belts 628 in a first direction conveys the articles away from the vehicle and toward the pick station(s). Alternatively, driving the belt(s) in a second direction that is reverse the first direction conveys the articles toward the vehicles.

Figure 6C:
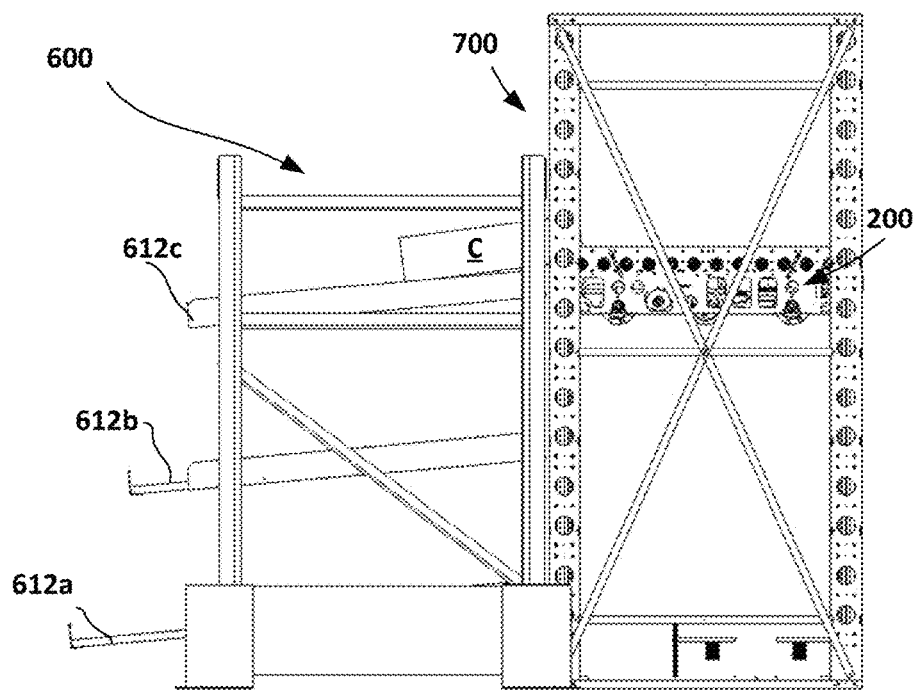
FIG. 6C is a side elevational view of the moveable rack and flow rack illustrated in FIG. 6B shown in a connected position.
Figure 6D:
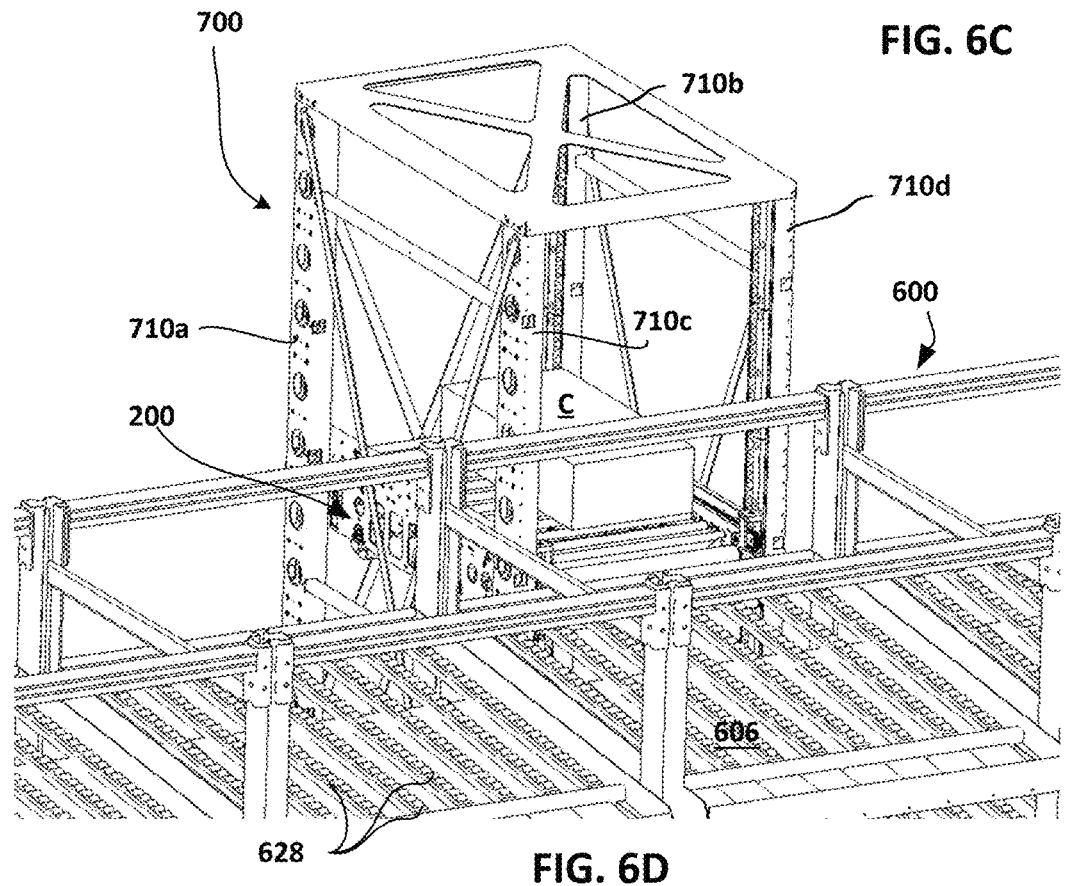
FIG. 6D is a front perspective view of the moveable rack and flow rack illustrated in FIG. 6A.

Turning now to FIG. 6C, there is shown a side elevation of the illustrative embodiment of FIGS. 6A and 6B, subsequent to docking of the moveable rack 700 with the flow rack structure 600 and elevation of the vehicle 200 within the task activity zone Z. As depicted, the illustrative rack structure includes three tiers of storage locations, indicated generally 612a,b,c, respectively. The vehicle 200 is shown as having reached a vertical elevation within task activity zone Z of column 700 that is aligned with the uppermost storage tier 612c, and the rollers of the vehicle transfer mechanism 210 have already been activated to advance container C onto a target surface of rack structure 600.

In one or other embodiments of inventory management system 600, vehicle 200 may incorporate the clutch mechanism-equipped second drive system and transfer mechanism features of vehicle 200. In such embodiments, an onboard motor of vehicle 200 is operated to cause the vehicle to climb within activity zone Z. In the present instance, gear wheels of vehicle 200 rotate against teeth of track 720. As a result, forward omnidirectional wheels and rear omnidirectional wheels leave their respective positions of support upon the underlying support surface. In addition, pivotable carriers drop the second drive elements and, at the same time, one or more clutch mechanism(s) are engaged. Engagement of the clutch mechanism(s), in turn, enables rotation of the sprockets of the transfer mechanism 210. Rotation of one or more additional motors drives endless carrier and cause the transfer mechanism to advance the container C onto surface 612c of the storage structure 600.

With continuing reference to FIG. 6C, it should be noted that if the pitch angle of the storage tiers is sufficient, it may be possible for containers C to advance solely by action of gravity in for example, a passive roller or a chute configuration. In the embodiments exemplified by FIGS. 6D to 6G, however, the multi-level rack structure(s) 600 of inventory management system 600 includes a discharge assistant at each level. In some embodiments the discharge assistant comprises a plurality of parallel belts 628 and, optionally, sensors for determining the timing for advancing inventory items deposited by vehicles, as vehicle 200, toward the end closest the picker(s).

By way of illustrative example, inventory management system 600 is deployed in an order fulfillment facility according to an e-commerce application. Vehicle 200 supplies containers, as containers C1 and C2 which may contain a plurality of individual inventory items. In this instance, a warehouse management system (WMS) of the facility has determined that subsets of inventory items, indicated generally at $I_{S1}$, $I_{S2}$, $I_{S3}$, $I_{S4}$, $I_{S5}$, and $I_{S6}$, will be needed at sufficient volumes during the current or an approaching inventory management interval as to justify their continued placement in rack structure 600. In embodiments, dynamic placement of inventory items utilizing vehicles 200 and moveable tracks 700 reduces the time needed to retrieve items so that they can be packaged for shipment as part of an e-commerce operation. By way of illustrative example, a human operator moves between a packing station and the item transfer area A proximate rack structure 600, which isolates them from vehicle 200 operating in item transfer area B.

Figure 6E:
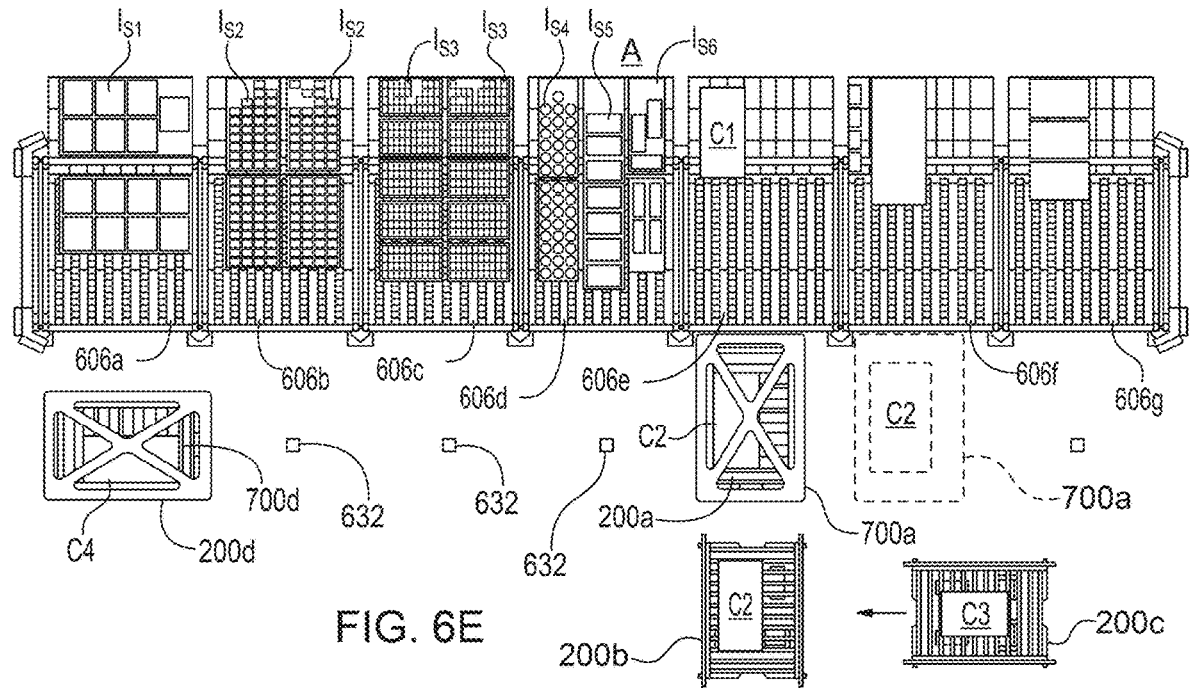
FIG. 6E is a plan view of the moveable rack and flow rack illustrated in FIG. 6A.
Figure 6F:
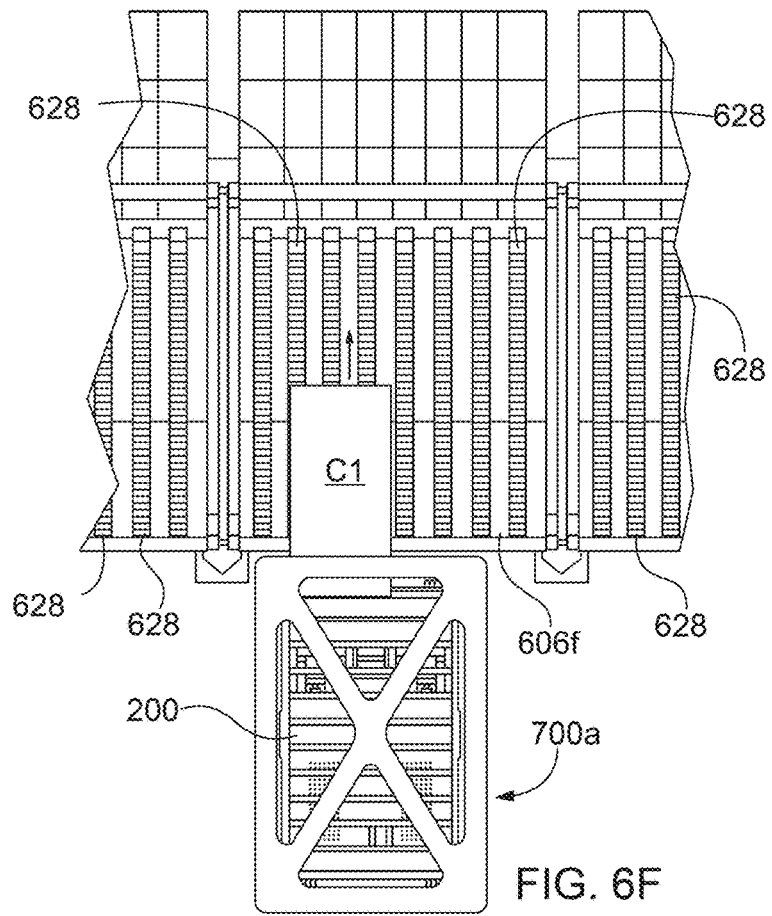
FIG. 6F is an enlarged plan view of a portion of the moveable rack and flow rack illustrated in FIG. 6E.

With reference to FIGS. 6D and 6E, it will be seem that vehicle 200 has discontinued its ascent within the task management zone of the moveable rack 700, having stopped at the transfer position associated with a plurality of third tier locations indicated generally as 612c at which are also collectively identified at numeral 606 in FIG. 6D and as 606a-g in FIG. 6E.

At least some subsets of the items, as subsets $I_{S1}$ to $I_{S5}$, as well as the contents of the container C1 and those containers in storage area 600g may continue to be needed at sufficient volumes—during a current or an approaching inventory management interval—as compared to other items processed by the facility, to flow rack structure 600. In this instance, the WMS has determined that other items stored in rack structure 600—such as those items stored in container C2 for retrieval during an earlier phase of the current inventory management interval (and/or during a preceding one)—no longer have sufficient priority as to be present in the same quantity, or at all, in rack structure 600. In embodiments consistent with the present disclosure, the same vehicle 200 and moveable rack 700, may be used to replace container C2 with a different container. An exemplary sequence of such a replacement operation will be described by reference to FIGS. 6G to 11I.

FIG. 6E is a top plan view depicting of the illustrative embodiment of FIGS. 6A to 6D, depicting temporary deployment of moveable rack 700 into a position of interlocked alignment with storage location 612 of rack structure 600. While in this position, the vehicle 200 is elevated within task activity zone of rack 700 to retrieve container C2 in a manner as previously described, and then the vehicle 200 returns to the underlying surface. Further operation of the gear wheels causes lifting of track 700 from the underlying support surface, and the vehicle 200 relocates the rack 700 to the solid line position shown in FIG. 6E. In the illustrative embodiment of FIG. 6E, movements of the vehicle 200, as well as those of vehicles 200b to 200d shown in FIG. 6E, are guided by a grid of fiducial markings, indicated at 632, which are sensed by one or more imaging sensors of each vehicle. It should, however, be understood that other position tracking systems and techniques may be utilized without departing from the spirit and scope of the present disclosure.

Autonomous Storage

Referring again to FIGS. 1 and 7, the system may include a plurality of racks 800 that optionally may be positioned to form rows or aisles 850. For instance, a first rack 800a may be spaced apart from a second rack 820b so that an aisle 850a is formed between the two racks. In particular, the first rack 820a may be substantially parallel to the second rack to form an aisle having a substantially uniform width. Additionally, the system may include a plurality of racks forming a plurality of aisles 850a,b. Although the aisles 850a,b are illustrated in FIG. 7 as being parallel, it should be understood that if the system incorporates a plurality of racks 800, the racks may be arranged in a variety of configurations and if the system includes a plurality of aisles 850, the aisles need not be parallel.

One of the inventory management tasks assigned to a vehicle 200 may be to retrieve items from the storage locations 800. This task can be viewed as a series of sub-tasks which include exiting the current or starting location of the vehicle, traversing a path which takes the vehicle between the starting location to an intermediate destination adjacent a point of entry into the array of storage locations and, at the intermediate destination, aligning the vehicle 200 with the point of entry. As a further sub-task of the retrieval task, the aligned vehicle enters the array and maintains its alignment until it reaches the column within which the vehicle is positioned, is operated to climb, according to yet another sub-task, until it reaches a target one of the storage areas 820. As further sub-tasks of the retrieval process, a transfer mechanism of the vehicle is operated to retrieve an item, descend within the column until the vehicle rests upon a support surface, and then exit the array of storage location. As a final sub-task of the retrieval operation, the vehicle 200 proceeds along a path to an output station 500, where an operator can retrieve the item from the vehicle.

Optionally, the system includes an automated element for storing and retrieving totes from the storage locations. One such automated element is an autonomous vehicle. For example, as discussed further below, the automated element may include a plurality of autonomous vehicles 200. Additionally, the automated vehicles 200 may be configured to transport the totes 55 to workstations 500. At the workstation 500, one or more items may be removed from a tote on one of the vehicles 200. In one embodiment, a human operator may remove an item from the vehicle. However, it should be understood that an automated mechanism may remove the item from the vehicle. Accordingly, it should be understood that the operator that handles items at the workstation(s) 500 may be a human operator or an automated mechanism or a combination of the two.

The system 10 and/or various components of the system may be controller by a central controller 450, such as a microcomputer. The central computer may receive signals from various elements, such as sensors and control various aspects of the system based on signals received from the various components. The central controller may also store data regarding the location of various items to be retrieved from the system. Additionally, the central controller may include data regarding the identification of items to be retrieved, such as a number of items to fill customer orders, as well as the quantify of such items. In this way, the central controller may control and coordinate the operation of various elements to schedule the retrieval and processing of a variety of items from the storage locations.

FIG. 7 is a plan view depicting a part of an inventory management system 800, which may form part of the system shown in FIG. 1 and utilizes autonomous vehicles 200 to transfer containers 55 of inventory items back and forth between a picking area and a vertical array of storage locations 820. The system may incorporate a plurality of vehicles 200 and the array of storage locations 820 as elements of an automated storage and retrieval system (AS/RS). The vehicles 200 may be configured in the same manner as the vehicles 200 described above. However, it should be understood that the vehicles may have modifications for different tasks within the system if desired.

In any event, and turning now to FIGS. 1 and 7-13, a system for storage and retrieval of items within an array of storage locations 820 will now be described in detail. Turning first to FIGS. 1 and 7, a plurality of automated guided vehicles 200a to 200f are depicted being operated within or about a rack structure 800. As in previously described embodiments, the vehicles perform various item replenishment and/or item retrieval tasks and in this instance, some of those tasks involve retrieving containers from or returning the containers (or totes) to storage locations 820.

As discussed above, the system may include a plurality of racks that are spaced apart to form one or more aisles 850. Optionally, a track 840 may be positioned along one or more of the racks. For instance, the track may be fixedly connected to the racks 800. Additionally, the track may be configured to guide vehicles vertically so that the vehicles may be conveyed up and down the column to the storage locations in the column. Additionally, it may be desirable to position a first track along a rack on one side of the aisle, such as along rack 800a and a second track along a rack on the opposite side of the aisle, such as along rack 800b. The vehicles 200 may be configured so that the vehicle travels in the aisle 850a traveling with one side of the vehicle travelling vertically along a track 840a on rack 800a while simultaneously a second side of the vehicle travels vertically along a track 840b on rack 800b.

Each column may be formed by a plurality of vertical posts 815. The posts may be arranged so that a plurality of vertical posts are aligned in a parallel relation on one side of the column and a plurality of posts may be arranged in parallel relation on a second side of the column opposing the posts on the first side, as shown in FIGS. 8-10. As shown in FIG. 8, the posts 815 on each side may be interconnected by a plurality of horizontal members 817 that extend along the depth of the column.

The horizontal members 817 may be separate elements solely providing structural support for the column. Alternatively, the horizontal members may also support items stored in the storage locations 820. For instance, the horizontal supports may be planar elements forming shelves so that the shelves form storage locations. However, it should be understood that the horizontal supports may be any of a variety of configurations. For instance, in the embodiment illustrated in FIG. 9, the horizontal members are L-shaped brackets 817 that form elongated horizontal ledges to support edges of the totes 55 along the depth of the storage location. The horizontal brackets may be spaced apart from one another up the height of the vertical legs 815 to form a column of vertically spaced apart storage locations 820.

The column 810 of rack 800 has a depth, which from the perspective of FIG. 8 is similar to the length of horizontal bracket 817. The column 810 have a depth that is at similar to the length of a tote 55 or greater. For instance, the column may have a depth sufficient to accommodate at least one tote. However, the tote may overhang into the aisle 850, so the column may have a depth that is slightly less than the length of a tote. Alternatively, the column may have a depth sufficient to accommodate a plurality of totes arranged end to end as shown in FIG. 8. In the example illustrated in FIG. 8, the racks are sufficiently deep so that each storage location 820 can accommodate three totes 55 aligned end to end, wherein each tote is approximately similar of the length of the vehicles 200.

As described above, the vehicle has a length and a width. As shown in FIG. 2B, optionally the vehicle has a length "L" that is sufficiently greater than its width "W2". Referring to FIGS. 7-11, the rack 800 is configured so that each column 810 has a width that is significantly less than its depth. Specifically, the width of each column is similar to the width of the vehicle and the depth of the column is substantially greater than the length of the vehicle. Optionally, the column has a depth that is more than twice the width of the vehicle as shown in FIGS. 8 and 10. Additionally, the depth of the column may optionally be greater than the length of the vehicle.

FIG. 8 illustrates a plurality of vehicles in different orientations relative to the racks 800 and the storage locations 820. For instance, a first vehicle 200a is oriented for horizontal movement along path 860c, transverse the length of aisle 850. A second vehicle 200b is oriented for horizontal movement under the rack along path 860b that is parallel to the length of the aisle 850. Additionally, a third vehicle 200c is positioned within the aisle 850 to climb vertical tracks along the racks 800 on either side of the aisle. A fourth vehicle 200d is also positioned within the aisle and has climbed up the track 840a,b to a storage location 820 in an upper portion of the column 810. Finally, a fifth vehicle 200f is positioned under the rack 800 and is oriented at an intermediate position between the orientation of vehicle 200a and the orientation of vehicle 200b. In particular, the racks may be configured to facilitate the vehicles turning horizontally underneath the racks. The fifth vehicle 200f illustrates the vehicle in the process of turning under the rack from a first path to a second path.

As mentioned above, structure 800 is dimensioned and arranged such that the vehicles may enter and exit from various locations beneath the storage locations, allowing for flexibility in the installation of picking and/or replenishing stations. If the system utilizes one or more vehicles and one or more racks, the racks may be configured to allow the vehicles to travel under the racks 800 as well as being able to travel across or along one or more aisles that may be incorporated into the system. For instance, referring to FIG. 7, the vehicles may follow a path that moves along one or more path segments that may be parallel or transverse to the aisle. A first such path is designated as path 860a. Path 860a is within and parallel to the length of aisle 850a. A second such path is designated path 860b, which is parallel to the length of aisle 850a, but spaced apart from the aisle. Specifically, path 860b is located under rack 800b. Rack 800b may be configured to provide clearance for movement of the vehicle under the lowermost storage location 820 so that the vehicle may travel under the rack 800b along a path 860b that is parallel to the length of the aisle. A third path is designated 860c, which is transverse 860a and 860b. As shown in FIG. 8, path 860c is parallel to the depth of the column 810.

Referring to FIGS. 8 and 10, the rack is optionally configured so that the columns of the rack have a depth sufficient to provide multiple paths under each column that are substantially parallel to the length of the aisle 850. Specifically, as shown in FIG. 8, the posts 815 adjacent the aisle 850 may be spaced apart from the posts 815 remote from the aisle to form an opening having a width that is greater than twice the width of the vehicle.

FIG. 10 illustrates vehicle 200b moving along path 860 that is parallel to the aisle and vehicle 200c moving along path 860' that is parallel to path 860. Preferably path 860' has a centerline that is spaced apart from the posts 815 adjacent the aisle by a distance that is greater than half the length "L" of the vehicle 200 (see FIG. 2B). Similarly, preferably path 860 has a centerline that is spaced apart from the posts at the rearward edge of the column remote from the aisle 850 by a distance that is greater than half the length of the vehicle.

Optionally, the paths 860, 860' under the rack that are parallel to the aisle may be spaced apart to provide a gap to allow a first vehicle travelling along path 860 to pass a second vehicle positioned along path 860', such as a vehicle travelling in an opposite direction along path 860'. For instance, path 860 may be spaced apart from path 860' by a distance greater than the width "W2" of vehicle 200 (see FIG. 2B).

Additionally, as discussed above, the vehicles may change direction by rotating about a vertical axis of rotation that passes through the vehicle. In particular, the axis of rotation may pass through the center of the vehicle. The columns 810 preferably have a depth sufficient to facilitate the vehicle rotating about the axis of rotation while the vehicle is positioned in the column under the rack. Specifically, each of path 860, 860' is preferably spaced apart from the posts 815 a distance greater than the distance from the axis of rotation to each of the corners of the vehicle.

When the vehicle turns under the rack 800, the vehicle may turn in any of a variety of angles. Optionally, the vehicle may turn in increments of 90 degrees. In particular, optionally, the vehicle turns either 90 degrees or 270 degrees after exiting the aisle so that the vehicle travels parallel to the aisle under the rack after climbing the track in the aisle.

FIG. 9 is a side elevation view depicting the rack structure 800 that includes a plurality of columns 810a-810f populated within a number of containers or totes, including totes $T_a$, $T_b$, $T_c$ and $T_d$. A plurality of vehicles operating to perform various item replenishment and/or item retrieval tasks as part of the inventory management system. Vehicle 200a is shown having entered the leftward most drive column 810a. In this regard, and with reference now to FIG. 10, it will be seen that the structure 800 may incorporate an array of parallel guide rails, as rails R1 and R2, which define a gap $g_G$ between them. The gap is dimensioned and arranged to receive corresponding alignment structures on the vehicles to enable entry, exit and reorientation of the vehicles without damage to each other and the rack structure as discussed further below.

Optionally, the system may also include one or more guides 880 to guide or align the vehicles as they travel. For instance, referring to FIGS. 2E and 10, the guide 880 may include a channel or groove and the vehicle may include a corresponding guide element 235 that cooperates with the guide 880 to control movement of the vehicle 200. One example of a guide element is a follower 235. The follower may be any element configured to engage with or cooperate with the guide 880. In the present instance, the vehicle 200 includes a central follower 233 that includes a rotatable element such as a bearing that rotates about a vertical axis. Optionally, the follower 233 includes a shaft so that the follower projects away from a surface of the vehicle, such as downwardly from a lower surface of the vehicle. The central follower 233 engages the channel in the guide 880 to constrain horizontal movement of the vehicle.

Optionally, the vehicle may also include one or more lateral guide member 235. The lateral guide members 235 may cooperate with an outer surface of the guide 880 to constrain movement of the vehicle. For instance, guides 880 may comprises circular guides having a circumferential surface for guiding the rotation of the vehicles. The vehicle may have a pair of lateral guide members 235 spaced apart from one another a distance equal to the diameter of the circumferential surface of the guide. In this way, the lateral guides 235 engage the circumferential surface of the guide to constrain the vehicle to rotational motion.

Referring to FIG. 10, optionally the guide 880 includes a plurality of intersecting guideways. For instance, guide 880 may include a first guideway 882 in the form of a groove or channel having walls spaced apart a distance substantially similarly to the width of central follower 233 of the vehicle. The first guideway 882 may be oriented so that it extends parallel to pathway 860. Additionally, guide 880 may have a second guideway 884 in the form of a groove or channel have walls spaced apart a distance substantially similar to the width of the follower 233 of vehicle 200. The second guideway 884 may be oriented so that it extends transverse pathway 860. In the present instance, guideway 884 extends substantially perpendicular to pathway 860. In this way, the first and second guideways 8828, 884 of guide 880 extend in a linear direction that is preferably parallel or perpendicular to the aisle 850.

Guide 880 may optionally include a non-linear guideway. For instance, the perimeter of the guide may form a non-linear guide surface identified as 886 in FIG. 10. Specifically, the guide may have a substantially circular profile forming a circumferential bearing surface. The diameter of the circular profile may have a diameter corresponding to the distance between lateral guides 235 of the vehicle 200 (see FIG. 2D).

The guideways of the guide 880 optionally intersect to facilitate changing the direction of travel for the vehicle. For instance, guideway 882 may intersect guideway 884 to facilitate the vehicle changing direction from parallel to the aisle to perpendicular to the aisle or vice versa. The guideways 882, 884 may intersect at a center point of the guide. In this way, the guide may facilitate rotation of the vehicle about a vertical axis to turn the vehicle from one direction of travel along guideway 882 to a second direction of travel along guideway 884.

The guide 880 may guide the vehicle 200 to change direction as follows. The vehicle may move along a linear path with central follower 884 engaging guideway 882 or 884 to impede lateral displacement away from the linear path. The vehicle travels in a horizontal direction along the linear path until the central follower is positioned at the center point of the guide with the lateral guides 235 of the vehicle engaging the circumferential guideway 886. The vehicle 200 is rotated above a vertical axis to change the direction of travel. For instance, drive wheel 252a may be rotated in a first direction while drive wheel 252b is rotated in a second direction that is reverse of the first direction to perform a zero radius turn. While the drive wheels 252a,b rotate the vehicle about the axis of rotation, the lateral guides 235 impede lateral displacement of the vehicle away from the rotational path.

Optionally, the guides 880 are aligned with the columns to facilitate rotation of the vehicle within the column while aligning the width of the vehicle with the opening between posts 815 at the front of the column (adjacent the aisle 850) or at the back of the column (remote from aisle 850).

Optionally, as shown in FIG. 10, the system may include a floor mounted lateral alignment system 890 which consists of a pair of plate members separated by gap $g_G$. In this instance, the gap defined by alignment system 890 is oriented with those defined by alignment system 895 so as to permit a vehicle to quickly and easily traverse the entire width of the structure while maintaining a generally constant angular orientation within the drive columns D1 to D6.

Figure 11:
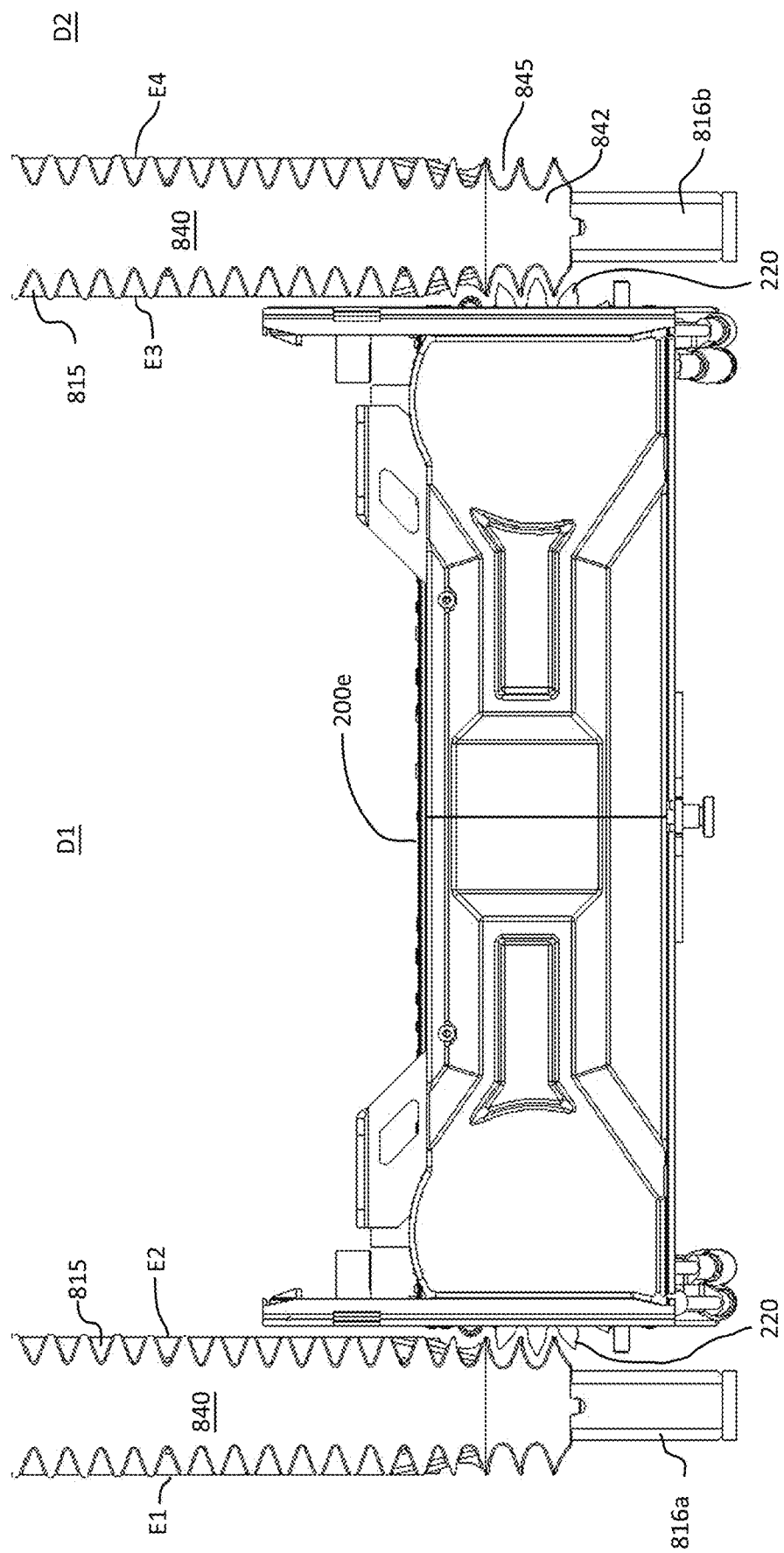
FIG. 11 is an enlarged fragmentary side elevational view of the aisle illustrated in FIG. 13A.

As described above, a plurality of guide elements, such as track elements 840 may be attached to the rack 800 to guide the vehicles into alignment with storage locations positioned above the floor. For instance, the track 840 may comprises a plurality of vertical sections. Specifically, a vertical track section may be attached to each post within the aisle 850. Referring to FIG. 11, the vertical track section may have a profile for engaging the vertical drive system 220 of the vehicle. For instance, the track may include a plurality of teeth forming a rack extending up the height of the post 815.

As shown in FIG. 11, the track 840 may straddle the aisle so that a first track extends vertically upwardly along a first side of the column and a second track extends upwardly along a second side of the column. For instance, column D1 and vehicle 200e of FIG. 10 are illustrated in FIG. 11. Column D1 includes two spaced apart vertical posts 815 forming an opening having a width. Specifically, a first post has a first vertical edge E1 and a second vertical edge E2; and a second post has a first vertical edge E3 and a second vertical edge E4. The distance between vertical edges E2 and E3 is greater than the width W1 of the vehicle (see FIG. 2D). Optionally, the distance between vertical edges E2 and E3 is less than the width W2 of the vehicle (see FIG. 2D). In this way, the column width may be less than the distance between the outer tips of the gears of the vertical drive 220 of vehicle 200. Accordingly, the majority of the column may be narrower than the width of the vehicle at its widest point.

Optionally, the track 840 may be configured so that a first edge of the track projects toward a first column to provide a guide surface for the first column and a second edge of the track projects toward a second column to provide a guide surface for an adjacent column. For instance, track 840 may provide a first set of teeth projecting toward column D1 and a second set of teeth projecting toward column D2.

Additionally, the vertical posts 815 may optionally be configured to provide a stop to impede lateral displacement of the vehicle as the vehicle climbs the track 840. For instance, referring to FIG. 11 the post 815 overlaps with the teeth of track 840 so that edge E3 of post 815 extends beyond the root of the teeth of the track and preferably toward the crests of the track. In this way, the teeth of the vertical drive 220 mesh with the track while the post impedes the vertical drive from displacing laterally parallel to the depth of the column.

The vertical drive 220 of the vehicle 200 may be configured so that the vertical drive gears 220 are displaceable inwardly to reduce the distance between the vertical drive gears. In this way, the drive gears can be moved inwardly to provide clearance between the tracks 840 and the vertical drive gears as the vehicle drives into the column. Alternatively, as described above, the vertical drive gears may be mounted on shafts so that the axis of rotation of each vertical gear is substantially parallel to the horizontal direction of travel. Additionally, the axes of rotation of the vertical drive gears may be substantially fixed so that the lateral distance between each pair of vertical drive gears is substantially fixed. To enter the column, the teeth of the vertical drive teeth are aligned with the teeth in the track 840 so that the teeth of the vertical drive gears pass through the teeth in the track.

Referring to FIG. 11, the track 840 and the vertical drive gear 220 may be aligned so that the vertical drive gears do not impinge upon or contact the track when the vertical gear is translated relative to the track. For instance, the spacing between the teeth of track 840 provides sufficient clearance for the teeth of the vertical drive gear 220 to pass between the gaps between the teeth of track 840 when the vertical drive gear translates horizontally along a line that is parallel to the axis of rotation of the vertical drive gear 220. More specifically, the vertical drive gear and the track may be configured and positioned so that the addendum circle of the vertical drive gear 220 overlaps with the addendum line of the teeth in the track 840. While the addendum circle of the drive gear overlaps the addendum line of the track, the teeth of the gear are configured and oriented so that the vertical drive gear passes through the gaps between teeth in the track 840.

Referring again to FIG. 11, optionally, the vertical drive gear 220 and the track 840 may be configured and oriented to increase the clearance for the vertical drive gear to pass through the track when the vehicle drives the opening between the vertical posts 815 forming the width of the column (i.e. when the vertical drive gear translates so that the axis of rotation of the vertical drive gear translates in a horizontal direction perpendicular to the aisle). For instance, the track 840 may have an upper portion and a lower portion 842. The upper portion may have a tooth pitch and configuration to mate with the teeth of the vertical drive gear 220. The lower portion 842 may have a tooth pitch that is substantially similar to the tooth pitch of the upper section, but the tooth profile of the lower section may be substantially different than the upper section. For instance, the teeth of the lower section may be substantially narrower than the teeth of the upper section. For instance, the teeth may be at least 10% narrower and preferably at least 20% narrower. Optionally or additionally, the teeth of the lower section 842 may have dedendum that is substantially greater than the dedendum of the upper section. For instance, the dedendum of the lower section may be greater than the upper section so that the root of the teeth extends inwardly away from the drive gears a greater distance than the root of the teeth of the upper section. For instance, the dedendum of the teeth of the lower section may be 10% greater and preferably is 20% greater.

Additionally, the lower section 842 may optionally have a tapered pitch line so that the clearance between adjacent teeth gradually diminishes as the teeth progress up the height of the lower section. In other words, the clearance 845 between adjacent teeth at the bottom of the lower section is greatest and the spacing between adjacent teeth at the upper part of the lower section is at a minimum and the clearance gradually decreases from the maximum to the minimum.

Optionally, the posts 815 may have a variable width to facilitate the vertical drive passing through the opening between the posts 815. For instance, as described above, posts 815 may have a first width so that the edge E3 of the post extends beyond the root of the teeth of the track. Additionally, the lower portion 816a,b of the post 815 may have a reduced width relative to the upper portion of the post. Specifically, the post may have a reduced width so that the edge of the post terminates below the root of the tooth. In this way, the lower portion of the post has a width that is narrower than the upper portion of the post. Similarly, the distance between lower post 816a and lower post 816b is greater than the distance between edge E2 and edge E3. Additionally, the opening to the column between lower portion 816a and 816b is greater than the widest width W2 of the vehicle.

Configured as described above, the vertical drive 220 may optionally be configured to pass through openings in the track so that the vertical drive is aligned with the track. After the vertical drive is aligned with the track, the vertical drive is positioned to cooperate with the track to raise the track and/or to climb the track as described further above.

As noted above, a central controller 450 may provide control signals for controlling the vehicles 200. For instance, the central controller may control the operation of a vehicle to follow a path through the rack to retrieve a tote 55 from a storage location 820 in one of the columns 810 in the rack 800. The vehicle may follow a path along the ground to align the width of the vehicle with a path that extends through an opening between two vertical posts 815 of the rack 800. The vehicle may travel along the path crossing through a plurality of columns in the rack. Optionally, the central controller may provide signals to control a second vehicle so that the second vehicle travels along a second path parallel to the first path and under the same rack as the first vehicle so that the second vehicle passes the first vehicle under the rack.

After the vehicle passes through a plurality of columns under the rack, the vehicle reaches the column in the rack the select storage location is located. The central controller provides signals to stop the forward progress of the vehicle along the path. The central controller provides signals to turn the vehicle under the rack to align the vehicle with an opening in the column. After turning, the vehicle advances along a path parallel to the depth of the column so that the vehicle passes through the opening in the column and into the aisle. Optionally, the step of advancing the vehicle into the aisle includes the step of aligning a vertical drive element with gaps in the opening in the column. Once in the aisle, the vehicle is driven vertically upwardly until the vehicle is aligned with the desired storage location. The vehicle actuates a transfer mechanism to transfer an item from the storage location on the vehicle. Optionally, the storage location may include an item at the front edge of the storage location separating the vehicle from the desired item in the storage location. Accordingly, the vehicle may transfer the item at the front edge onto the vehicle, which in turn pulls the desired item to the front edge of the storage location. The vehicle is then driven vertically to a storage location having an open location for receiving an item. The vehicle then transfers the item toward the open location. The vehicle then moves vertically to the storage location having the desired item and drives the transfer mechanism to transfer the desired item onto the vehicle. After retrieving the desired item, the vehicle actuates the vertical drive mechanism to drive down the column until the vehicle engages a horizontal drive surface, such as the floor. The horizontal drive of the vehicle is engaged to drive the vehicle through the opening in the column in a direction transverse the aisle. After driving out of the aisle, the vehicle continues to drive in a horizontal direction to exit the rack 800. For instance, the vehicle may continue along a path transverse the aisle 850 and pass under one or more additional racks 800 and cross one or more additional aisles 850. Following such a path, the path of the vehicle is controlled so that the width of the vehicle is aligned with the opening in each column that the vehicle passes through. Alternatively, the vehicle is rotated around a vertical axis to turn the vehicle while into alignment with a path parallel with the aisle while the vehicle remains under the rack. The vehicle then crosses under one or more columns of the rack 800 until the vehicle exits from under the rack.

After the vehicle exits the rack 800, the central controller 450 may control the vehicle to direct the vehicle to one of a plurality of workstations 500. At the workstation the item is presented to an operator to remove one or more items from the vehicle. The central controller may then control the vehicle to direct the vehicle along a path to store the item it is carrying in an open storage place in the rack and retrieve a subsequent item at a different storage location. In this way, the central controller provides control signals to a plurality of vehicles to direct the vehicles along one of a plurality of paths to retrieve a plurality of items from the storage locations and deliver items to the workstation 500.

Control Process

Figure 12:
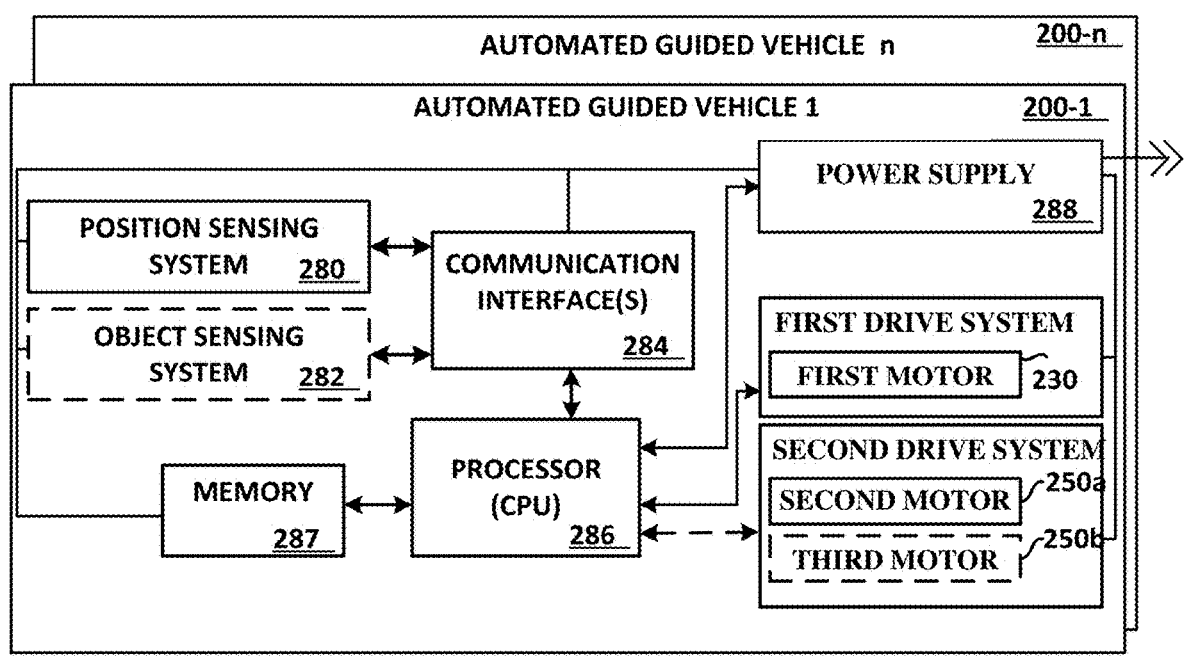
FIG. 12 is a block diagram depicting the subsystems of a plurality of guided vehicles according to one or more embodiments.

FIG. 12 is a block diagram depicting the subsystems of a plurality of guided vehicles 200-1 to 200-*n*, according to one or more embodiments. Each vehicle, as vehicle 200-1 may comprise a Central Processing Unit (CPU) 103, a memory 105, and communication interfaces. In some embodiments, the communication interfaces comprise one or more wireless transceivers compliant with corresponding wireless transmission protocol(s) such as IEEE 802.11, with the interfaces of a vehicle being used to communicate with other vehicles, as in a peer-to-peer topology, or with a central controller. In the latter regard, vehicles 200-1 to 200-*n* may include position sensors 280 and object sensors 282 and use the interfaces to communicate sensed information with a master controller, such as central controller 450. The position sensors, in one or more embodiments, include onboard imaging sensors for determining when the vehicle has passed over a fiducial marking positioned on an underlying support surface. Alternatively, however, the vehicles 200-1 to 200-*n* may utilize signal triangulation and/or any other conventional technique for determining their respective locations relative to one another or enabling the controller to do so.

Each vehicle 200-1 includes a power supply 288 which may, for example, be a rechargeable power supply comprising ultracapacitors, one or more batteries, or a combination of these. In one or more embodiments, the power supply drives a first motor 230 of first drive system. First drive system may further include gear wheels driven by the first motor and used, for example, to drive the vehicle vertically. In the present instance, the power supply 288 also supplies power to a second drive system, which includes a second motor 250*a* and, optionally, a third motor 250*b*.

The CPU 286 may comprise one or more commercially available microprocessors or microcontrollers that facilitate data processing and storage. Various support circuits facilitate the operation of the CPU 286 and include one or more clock circuits, power supplies, cache, input/output circuits, and the like. The memory 287 comprises at least one of Read Only Memory (ROM), Random Access Memory (RAM), disk drive storage, optical storage, removable storage and/or the like.

Figure 13:
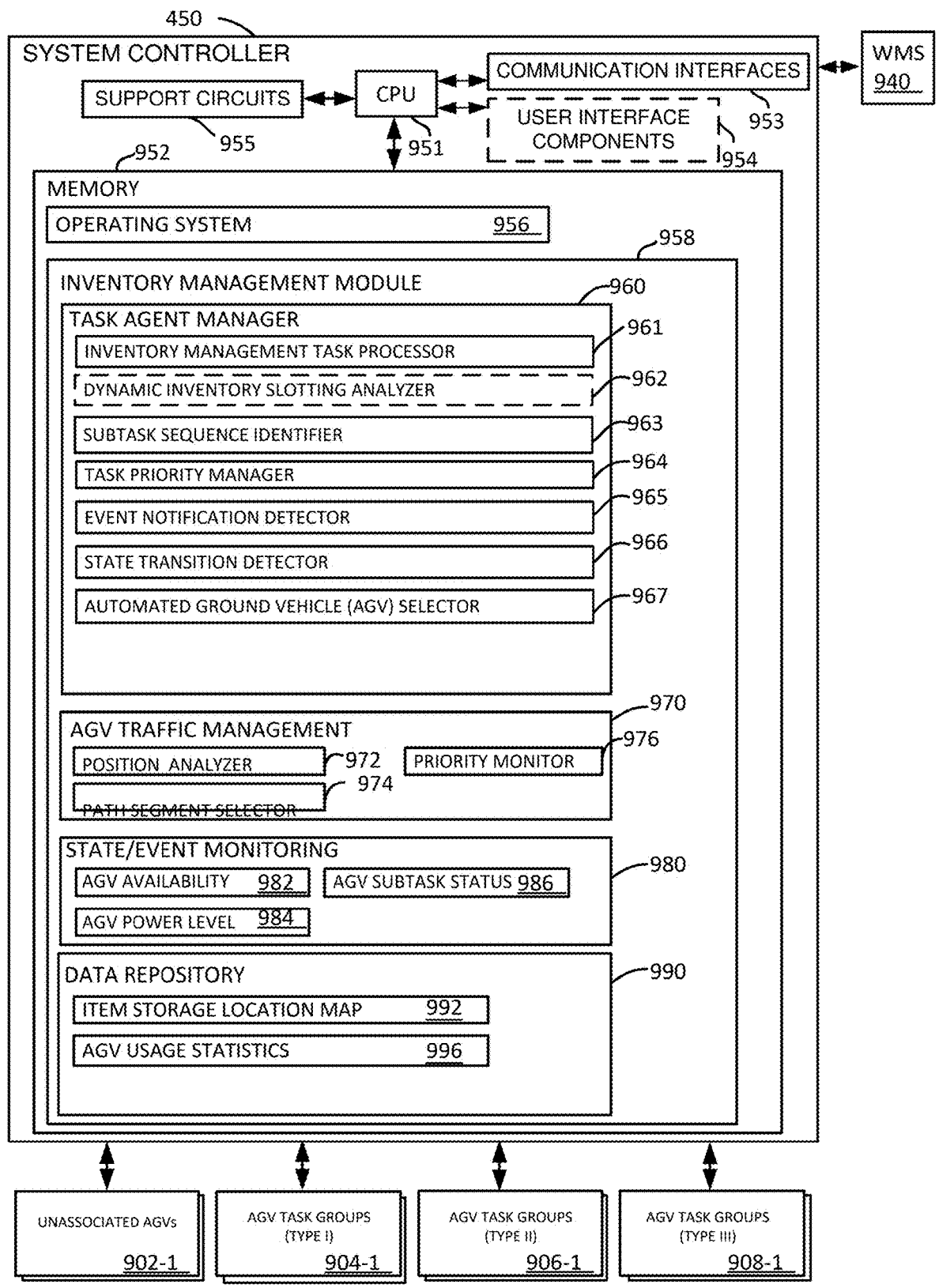
FIG. 13 is a block schematic diagram of a controller of the system illustrated in FIG. 1.

FIG. 13 is a block schematic diagram of a controller 450 which may be responsive to instructions received from a warehouse automation system (WMS) 1440 to coordinate the assignment and performance of inventory management task activities by a plurality of vehicles and subassemblies (e.g. moveable track 700 or flow rack 600), such as those assigned to AGV task groups 902-1, 904-1, 906-1 and 908-1. The controller 450 comprises a Central Processing Unit (CPU) 951, support circuits 955, a memory 952, user interface components 954 (which may include, for example, a display with touch sensitive screen or a separate keyboard), and communication interfaces 953. In some embodiments server 450 comprise one or more wireless transceivers compliant with corresponding wireless transmission protocol(s) such as IEEE 802.11.

The CPU 951 may comprise one or more commercially available microprocessors or microcontrollers that facilitate data processing and storage. The various support circuits 955 facilitate the operation of the CPU 951 and include one or more clock circuits, power supplies, cache, input/output circuits, and the like. The memory 952 comprises at least one of Read Only Memory (ROM), Random Access Memory (RAM), disk drive storage, optical storage, removable storage and/or the like. In some embodiments, the memory 952 comprises an operating system 956 and one or more inventory management applications. In some embodiments, the inventory management applications include a task agent manager module 960, an AGV traffic management module 970, a state/event monitoring module 980, and a data repository 990.

In one or more embodiments, the task agent manager 960 is configured with an inventory management task processor 961, a dynamic inventory slotting analyzer 962, a subtask sequence identifier 963, a task priority manager 964, an event notification detector 965, a state transition detector 966, and an AGV selector 967. The inventory management task processor 961, through execution of instructions by CPU 951, processes inventory management task requests received from the WMS 940.

In some embodiments, traffic management of the AGVs is performed by a traffic management module 470 of controller 450. In such cases, position, speed and direction data is collected from the vehicles at regular intervals by the controller. The position data is analyzed, and path segment selector 474 selects paths for each vehicle over the next control interval to ensure that there are no collisions with other vehicles, with personnel, or with fixed structures. The updated instructions corresponding to the path selections, inclusive of heading and direction, are transmitted by the controller back to the vehicles. In other embodiments, however, the vehicles do not rely on the controller for relative positioning instructions, but rather solely for destination and task assignments, with the vehicles instead relying on internal data gathering and spatial analysis capabilities.

To facilitate the aforementioned operations, the controller 450 of FIG. 13 includes a data repository which reflects an up to date location of all inventory items for which management and allocation responsibility has been assigned by the WMS, as well as a map of the vehicle locations within the facility. In addition, to facilitate the scheduling of preventive maintenance procedures, usage statistics are collected for all AGVs having moving parts, so that at regular intervals, parts can be inspected, lubricated, and/or replaced.

The order of methods described herein may be changed, and various elements may be added, reordered, combined, omitted, modified, etc. All examples described herein are presented in a non-limiting manner. Various modifications and changes may be made as would be obvious to a person skilled in the art having benefit of this disclosure. Realizations in accordance with embodiments have been described in the context of particular embodiments. These embodiments are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

Accordingly, while the foregoing is directed to embodiments of the present invention, other and further embodiments of the invention may be devised without departing from the basic scope thereof, and the scope thereof is determined by the claims that follow.

We claim:

1. A material handling apparatus for storing or retrieving a plurality of items, comprising:
    a plurality of storage racks spaced apart from one another forming an elongated aisle wherein each storage rack comprises a plurality of storage locations for storing containers containing items;
    a plurality of delivery vehicles wherein each vehicle comprises:
        a horizontal drive system operable to drive the vehicle along a horizontal surface,
        a vertical drive operable to drive the vehicle vertically; and
        a transfer mechanism operable to transfer an item between the vehicle and one of the storage locations;
    a conveyor spaced apart from the plurality of storage racks and having a generally horizontal conveyor surface configured to receive a container from one of the delivery vehicles and convey the container in a forward direction toward a workstation where an operator can remove one of the items from the container or in a reverse direction to convey the container away from the workstation and back toward the one delivery vehicle;
    a guide adjacent the conveyor configured to guide the delivery vehicles vertically upwardly to an upper position adjacent the conveyor surface;
    a central controller comprising a microprocessor programmed to provide control signals to control the delivery vehicles to perform the steps of:
        driving a first one of the vehicles on a horizontal surface toward a first of the storage racks;
        driving the first vehicle vertically upwardly to a first storage location in the first storage rack;
        transferring a first container from the first storage location onto the first delivery vehicle;
        driving the first vehicle downwardly with the first container to the horizontal surface;
        driving the first vehicle with the first container along the horizontal surface to the guide;
        operating the vertical drive to move the first delivery vehicle with the first container vertically upwardly along the guide to the upper position;
        transferring the first container onto the conveyor surface; and
        actuating the conveyor to convey the first container away from the first vehicle and toward the workstation.

2. The apparatus of claim 1 wherein the guide comprises a track having a vertical section and wherein the vertical drive is configured to engage the track to drive the vehicle upwardly.

3. The apparatus of claim 1 wherein the horizontal drive system comprises a plurality of rotatable wheels or rollers.

4. The apparatus of claim 3 wherein the vertical drive comprises a plurality of synchronously driven elements having teeth configured to engage the guide to drive the vehicles vertically up the guide.

5. The apparatus of claim 1 wherein the aisle is wider than a width of the delivery vehicles so that the vehicles can climb vertically within the aisle between the racks.

6. A method of storing or retrieving a plurality of items from a plurality of storage racks spaced apart from one another forming an elongated aisle wherein each storage rack comprises a plurality of storage locations for storing containers containing items, comprising the steps of:
    providing a plurality of delivery vehicles wherein each vehicle has a horizontal drive system, a vertical drive and a transfer mechanism operable to transfer an item between the vehicle and one of the storage locations;
    actuating the horizontal drive system of a first one of the vehicles to drive the first vehicle on a horizontal surface toward a first of the storage racks;
    actuating the vertical drive of the first vehicle to drive the first vehicle vertically upwardly to a first storage location in the first storage rack;
    transferring a first container from the first storage location onto the first delivery vehicle;
    driving the first vehicle downwardly with the first container to the horizontal surface;
    driving the first vehicle with the first container along the horizontal surface toward a transfer location;
    operating the vertical drive to move the first delivery vehicle with the first container vertically upwardly along a guide to an upper position at the transfer location, wherein the upper position is vertically spaced from the horizontal surface;
    transferring the first container onto a conveyor surface while the first vehicle is at the upper position; and
    actuating the conveyor in a forward direction to convey the first container away from the first vehicle;
    retrieving an item from the first container after the step of actuating the conveyor.

7. The method of claim 6 wherein the step of retrieving an item comprises using an operator to retrieve the item.

8. The method of claim 7 comprising the step of conveying the first container away from the operator and back toward the transfer location.

9. The method of claim 8 comprising the step of actuating the conveyor in a reverse direction to convey the first container toward one of the vehicles at the transfer location.

10. The method of claim 9 comprising the step of transferring the first container onto the one of the vehicles at the transfer location.

11. The method of claim 10 comprising the step of driving the one of the vehicles at the transfer location to one of the racks and transferring the first container into one of the storage locations.

12. The method of claim 11 wherein the step of driving the one of the vehicle at the transfer location comprises driving the vehicle along the horizontal surface.

13. The method of claim 12 wherein the step of driving the vehicle along the horizontal surface comprises driving the vehicle under one of the racks.

14. The method of claim 13 wherein the step of driving the vehicle under one of the racks comprises the step of turning the vehicle while the vehicle is under the rack.

15. The method of claim 11 comprising the step of actuating a vertical drive system of the vehicle to climb up one of the racks after the step of driving the one of the vehicles at the transfer location to one of the racks.

\* \* \* \* \*